(12) United States Patent
Hsu et al.

(10) Patent No.: US 8,792,185 B2
(45) Date of Patent: Jul. 29, 2014

(54) IMAGE LENS SYSTEM

(75) Inventors: Chih-Wen Hsu, Taichung (TW);
Ming-Ta Chou, Taichung (TW);
Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 145 days.

(21) Appl. No.: 13/594,197

(22) Filed: Aug. 24, 2012

(65) Prior Publication Data
US 2013/0308206 A1 Nov. 21, 2013

(30) Foreign Application Priority Data
May 18, 2012 (TW) .............................. 101117913 A

(51) Int. Cl.
*G02B 3/02* (2006.01)
*G02B 13/00* (2006.01)

(52) U.S. Cl.
CPC .................................. *G02B 13/0045* (2013.01)
USPC ........................................................ 359/714

(58) Field of Classification Search
CPC .................................................. G02B 13/0045
USPC .......................................................... 359/714
See application file for complete search history.

(56) References Cited

U.S. PATENT DOCUMENTS

| 7,446,955 | B1 | 11/2008 | Noda | |
| 2013/0107376 | A1* | 5/2013 | Tsai et al. | 359/714 |
| 2013/0258492 | A1* | 10/2013 | Asami | 359/663 |

* cited by examiner

*Primary Examiner* — James Jones
(74) *Attorney, Agent, or Firm* — Morris Manning & Martin LLP; Tim Tingkang Xia, Esq.

(57) ABSTRACT

An image lens system includes, in order from an object side to an image side, a first lens element with negative refractive power including a concave image-side surface; a second lens element with positive refractive power including a convex object-side surface; a third lens element with negative refractive power including an object-side surface and a concave image-side surface, the object-side surface and the image-side surface being aspheric; a fourth lens element with positive refractive power including a convex object-side surface and a convex image-side surface; and a fifth lens element with negative refractive power including a convex object-side surface and a concave image-side surface, the object-side surface and the image-side surface being aspheric, the fifth lens element having at least one inflection point.

26 Claims, 22 Drawing Sheets

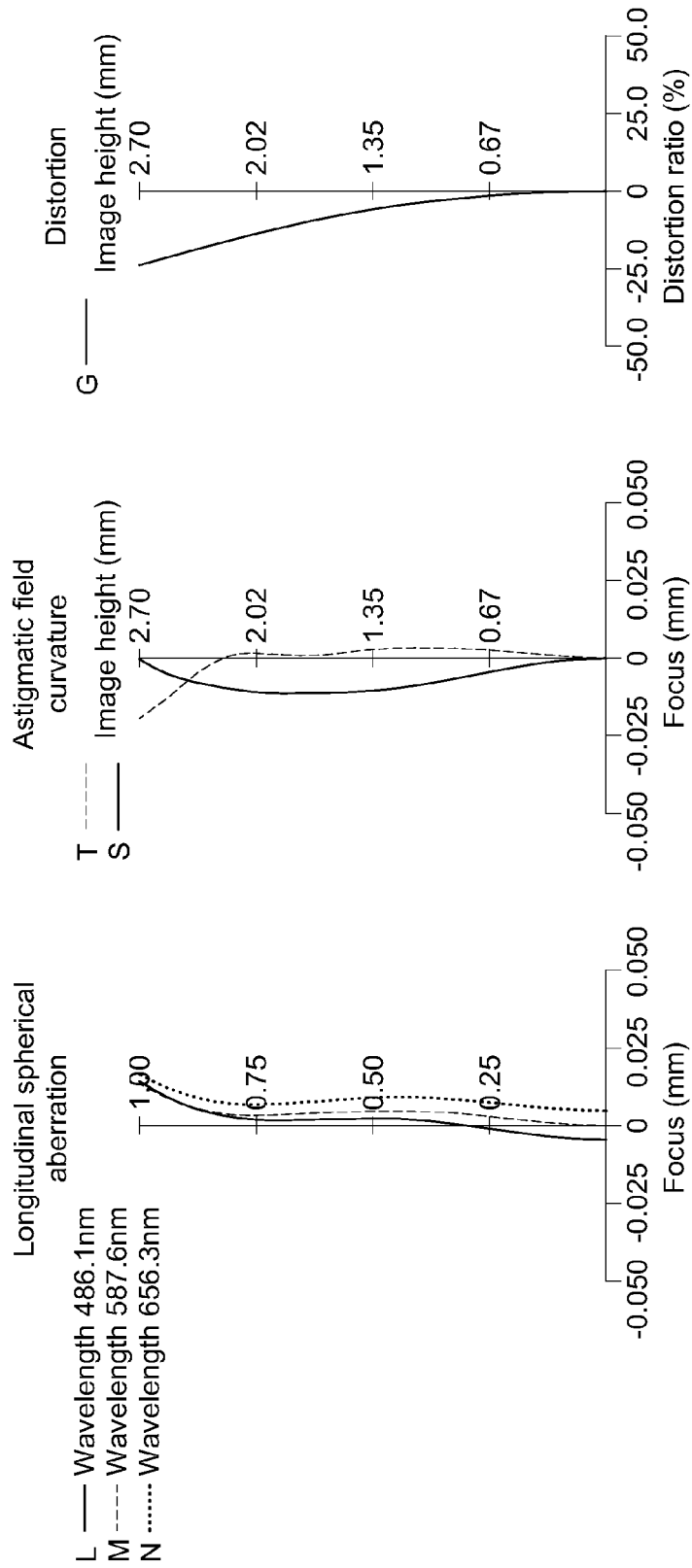

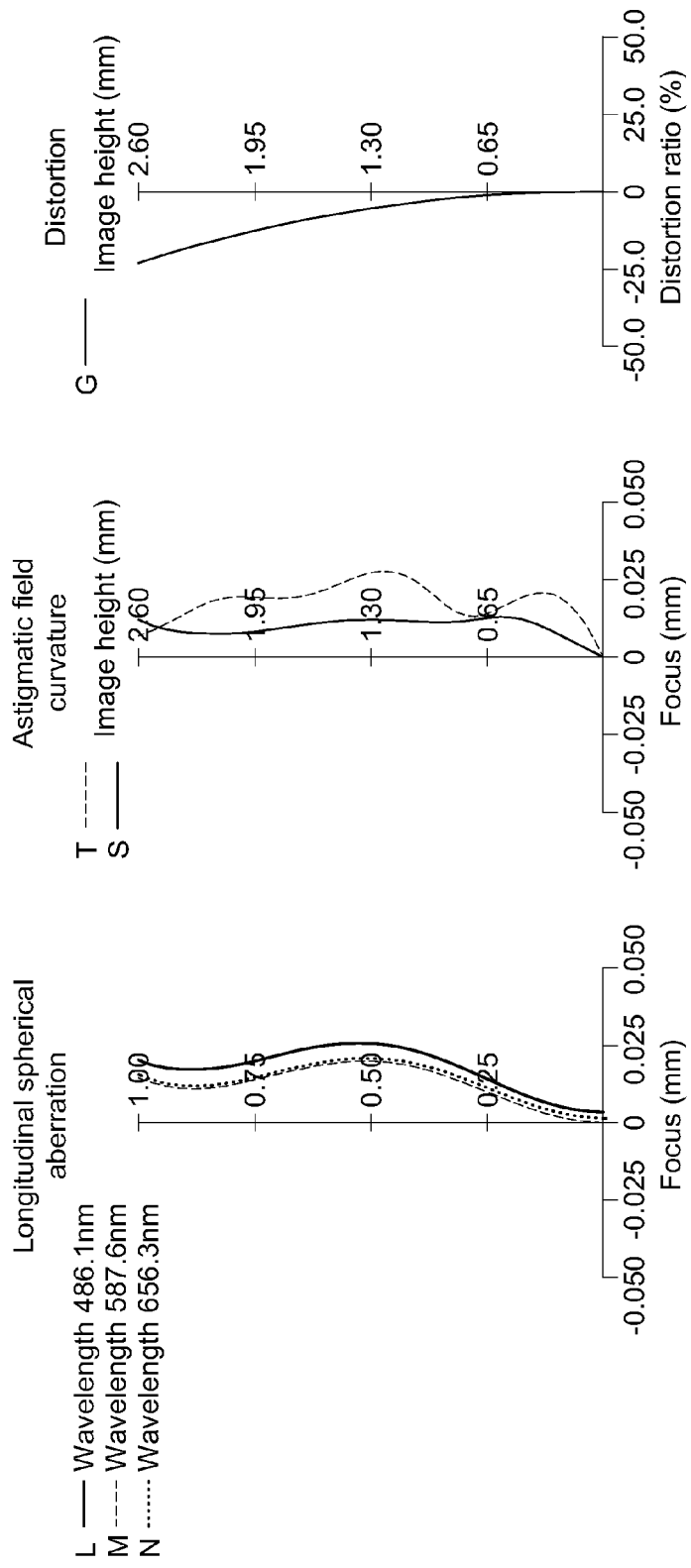

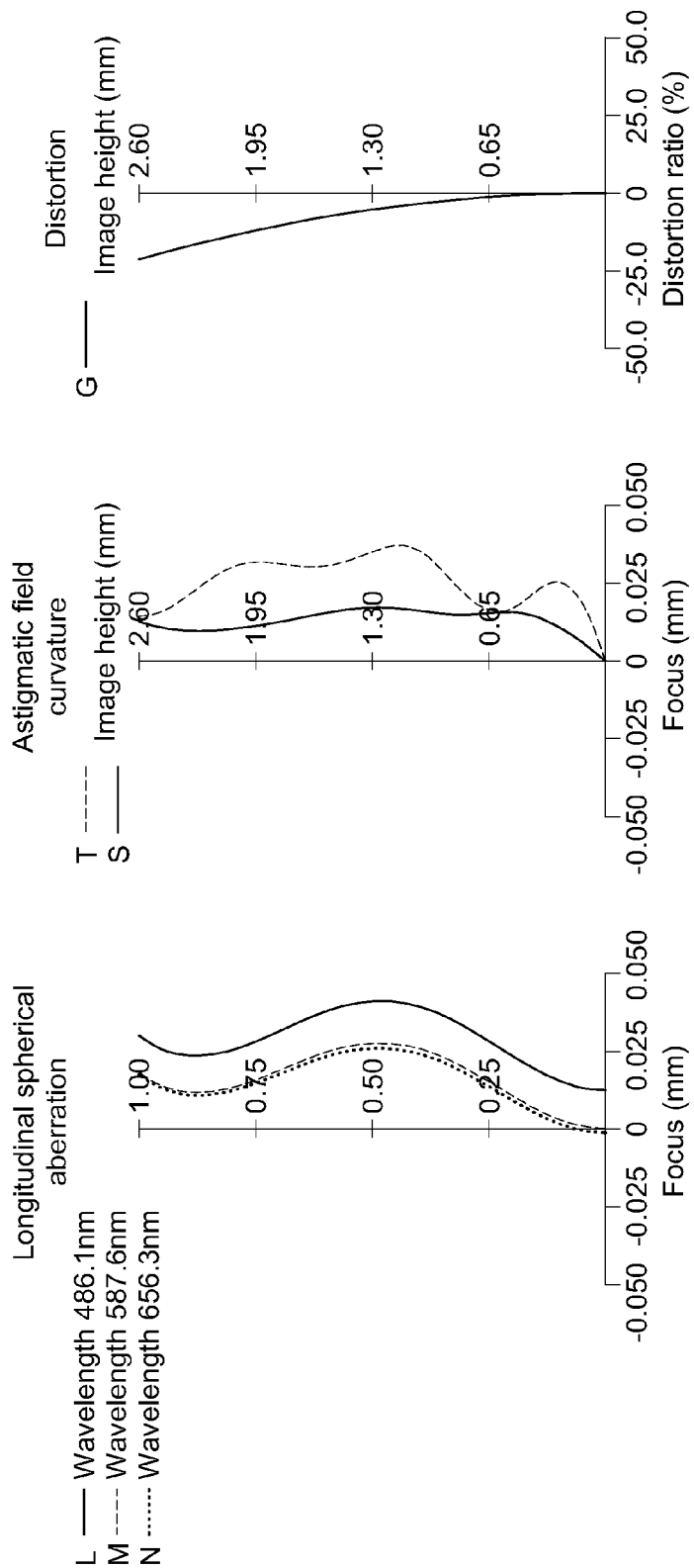

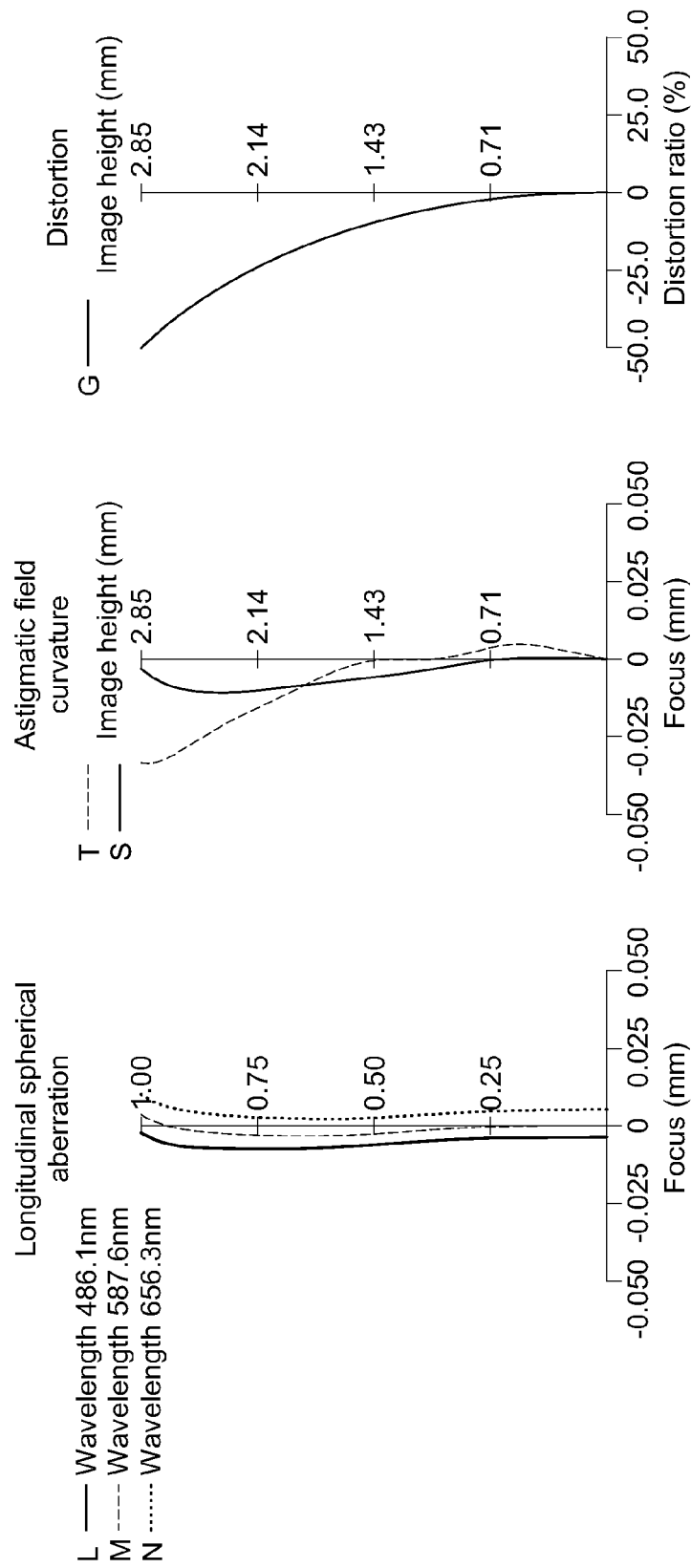

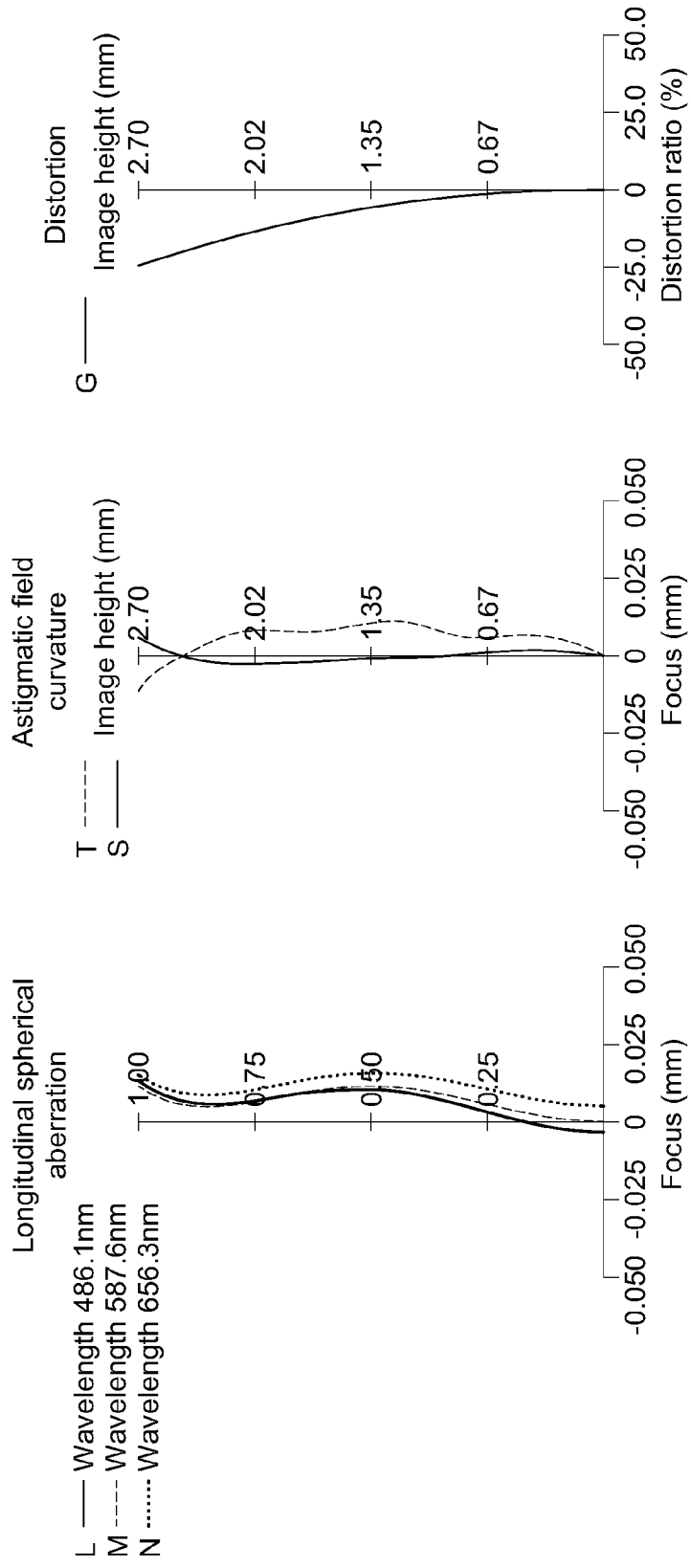

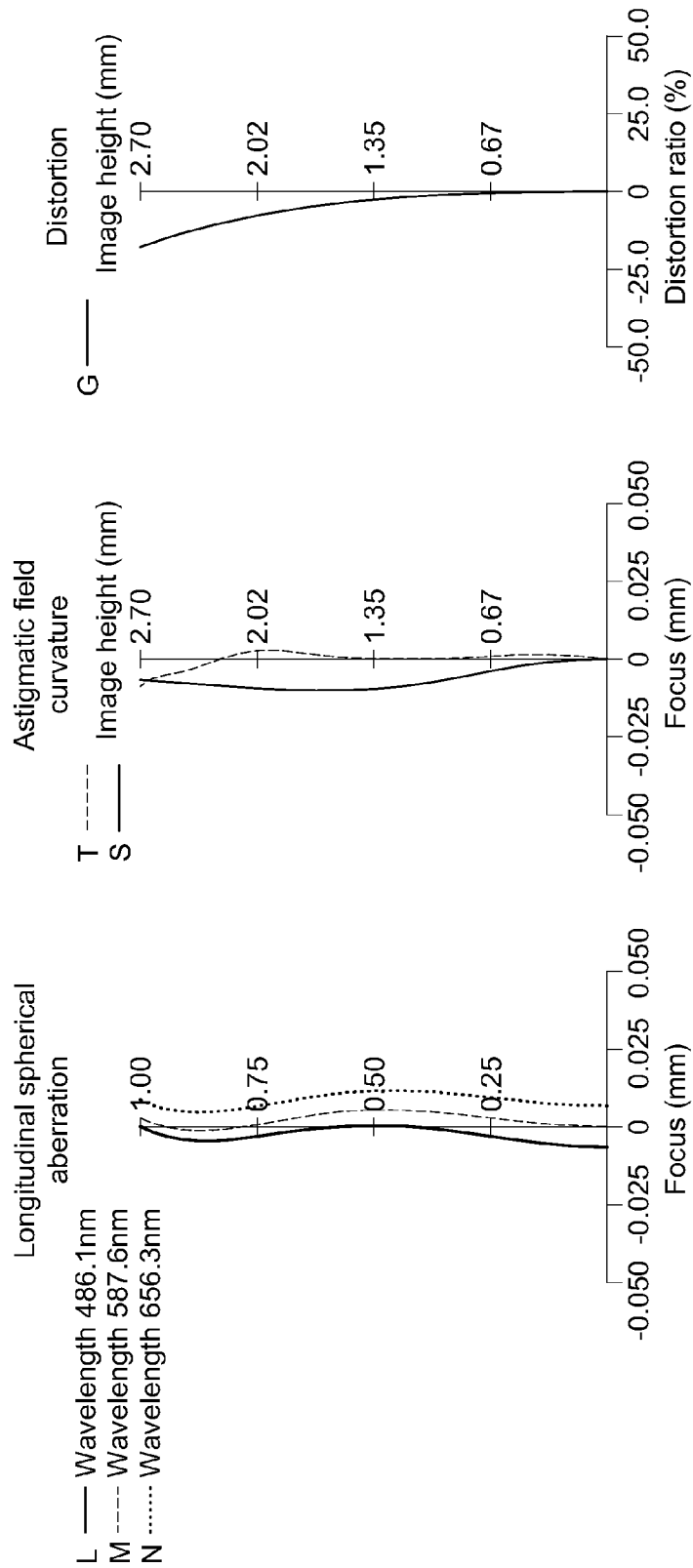

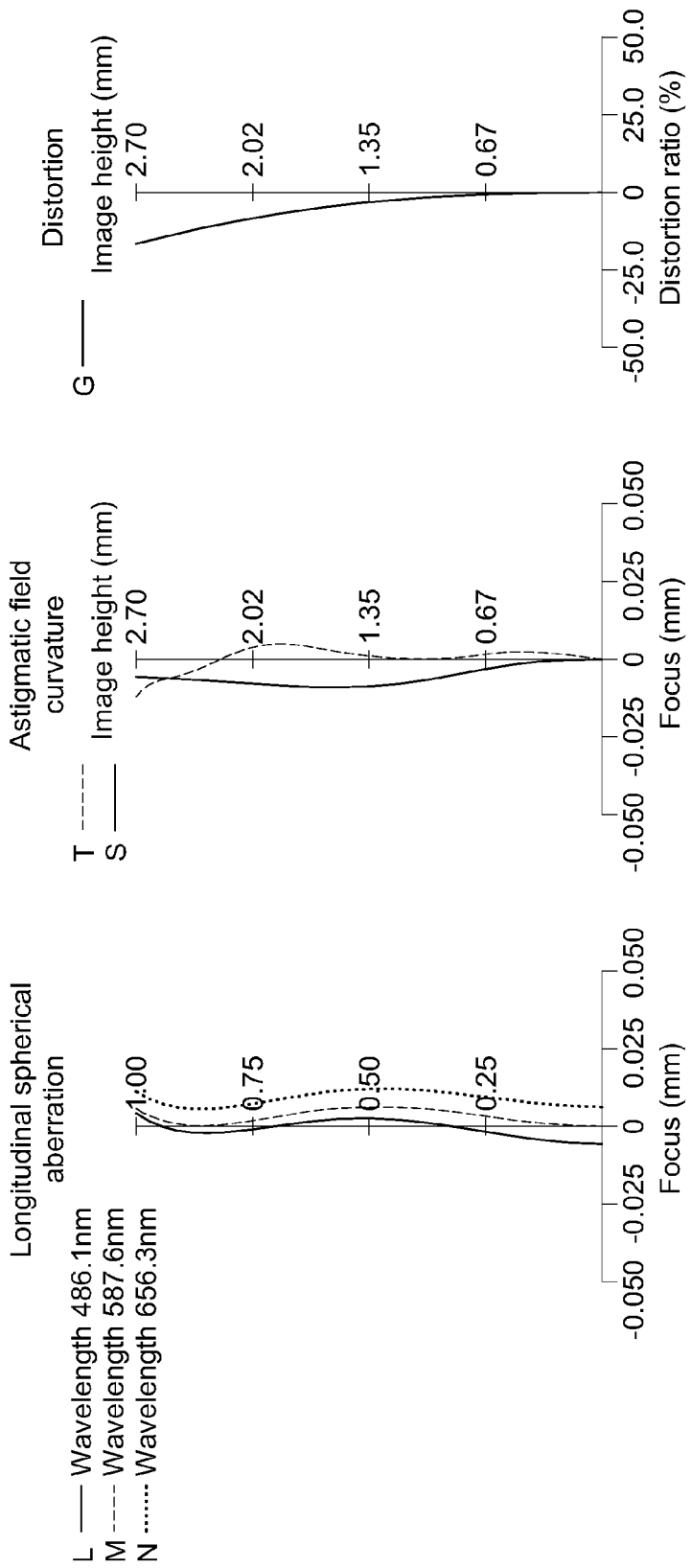

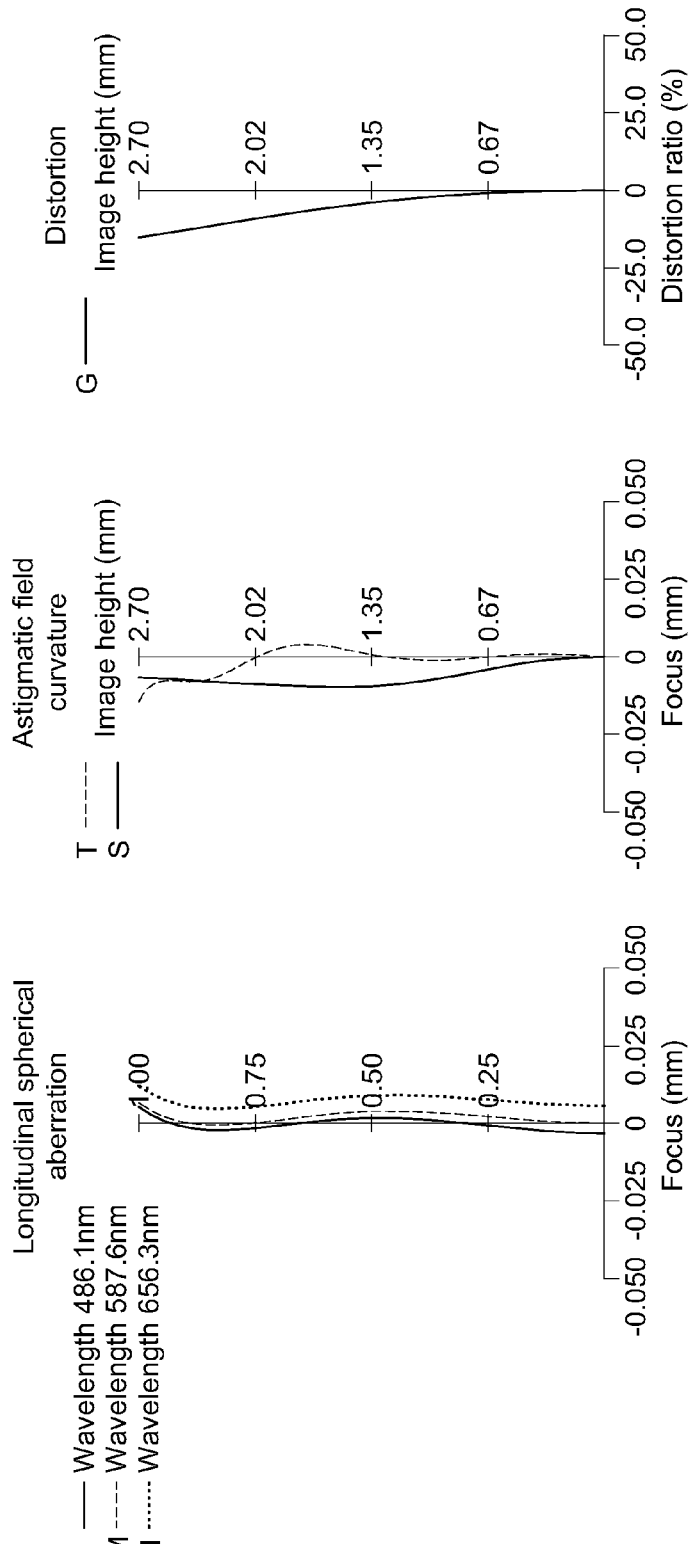

US 8,792,185 B2

IMAGE LENS SYSTEM

CROSS-REFERENCE TO RELATED APPLICATIONS

This non-provisional application claims priority under 35 U.S.C. §119(a) on Patent Application No(s). 101117913 filed in Taiwan, R.O.C. on May 18, 2012, the entire contents of which are hereby incorporated by reference.

BACKGROUND

1. Technical Field

The present disclosure relates to an image lens system, and more particularly, to an image lens system having multiple lens elements alternating with positive and negative refractive powers.

2. Related Art

In recent years, an optical lens assembly is widely used in various applications, such as mobile phone camera, webcam, car camera, video surveillance system and electronic entertainment device. The photo-sensing device of an ordinary photographing camera is commonly selected from a charge coupled device (CCD) and a complementary metal-oxide semiconductor (CMOS) device. In addition, with the advance of semiconductor manufacturing technology, the miniaturization of pixel size of the photo-sensing device is enabled, which develops the high pixel density and miniaturization of the optical lens assembly. Therefore, how to obtain superior image quality by the miniaturized optical lens assembly of the compact photo-sensing device is the main goal for manufacturers.

Considering the imaging need of capturing a wide range of area at one time, the general optical lens assembly applicable to car, video surveillance system and electronic entertainment device requires a larger field of view. The structure of a front lens group with negative refractive power and a rear lens group with positive refractive power is adopted in a conventional wide-angle photographic lens assembly, constructing a so-called inverse telephoto structure, thereby obtaining the characteristic of wide field of view. For example, U.S. Pat. No. 7,446,955 discloses a four-lens structure having a front lens group with negative refractive power and a rear lens group with positive refractive power. However, such lens assembly structure may obtain larger field of view, but this lens structure with only one lens element in the rear group is unfavorable for minimizing the aberration. Moreover, due to the popularization of a rear view camera in modern automobiles, the adoption of the wide-angle optical lens assembly with high resolution is becoming a trend. In view of this, there is a need that the total length of a wide-viewing-angle optical lens assembly with high image quality is not excessively long.

SUMMARY

According to an embodiment, an image lens system comprises, in order from an object side to an image side, a first lens element with negative refractive power, a second lens element with positive refractive power, a third lens element with negative refractive power, a fourth lens element with positive refractive power, and a fifth lens element made of plastic with negative refractive power.

The first lens element comprises a concave image-side surface. The second lens element comprises a convex object-side surface. The third lens element comprises an object-side surface and a concave image-side surface, and the object-side surface and the image-side surface of the third lens element are aspheric. The fourth lens element comprises a convex object-side surface and a convex image-side surface. The fifth lens element comprises a convex object-side surface and a concave image-side surface, the object-side surface and the image-side surface of the fifth lens element are aspheric, and the fifth lens element has at least one inflection point.

The image lens system satisfies the following condition:

$0 \leq R_6/|R_5| < 1.0$     (Condition 1):

wherein $R_5$ is the curvature radius of the object-side surface of the third lens element, and $R_6$ is the curvature radius of the image-side surface of the third lens element.

According to another embodiment, an image lens system comprises, in order from an object side to an image side, a first lens element with negative refractive power, a second lens element with positive refractive power, a third lens element with negative refractive power, a fourth lens element with positive refractive power, and a fifth lens element made of plastic with negative refractive power.

The first lens element comprises a concave image-side surface. The second lens element comprises a convex object-side surface. The third lens element comprises an object-side surface and a concave image-side surface, and the object-side surface and the image-side surface of the third lens element are aspheric. The fourth lens element comprises a convex image-side surface. The fifth lens element comprises a convex object-side surface and a concave image-side surface, the object-side surface and the image-side surface of the fifth lens element are aspheric, and the fifth lens element has at least one inflection point.

The image lens system satisfies the following condition:

$0 \leq R_6/|R_5| < 1.00$; and     (Condition 1):

$0.5 (\text{millimeters;mm}) < f/\tan(HFOV) < 3.0 (\text{mm})$     (Condition 2):

wherein $R_5$ is the curvature radius of the object-side surface of the third lens element, $R_6$ is the curvature radius of the image-side surface of the third lens element, f is the focal length of the image lens system, and HFOV is a half of the maximal field of view in the image lens system.

According to yet another embodiment, an image lens system comprises, in order from an object side to an image side, a first lens element with negative refractive power, a second lens element with positive refractive power, a third lens element with negative refractive power, a fourth lens element with positive refractive power, and a fifth lens element made of plastic with negative refractive power.

The first lens element comprises a concave image-side surface. The second lens element comprises a convex object-side surface. The third lens element comprises a convex object-side surface and a concave image-side surface, the object-side surface and the image-side surface of the third lens element are aspheric. The fourth lens element comprises a convex image-side surface. The fifth lens element comprises a convex object-side surface and a concave image-side surface, the object-side surface and the image-side surface of the fifth lens element are aspheric, and the fifth lens element has at least one inflection point.

The image lens system satisfies the following condition:

$0 \leq R_6/|R_5| < 1.0$     (Condition 1):

wherein $R_5$ is the curvature radius of the object-side surface of the third lens element, and $R_6$ is the curvature radius of the image-side surface of the third lens element.

BRIEF DESCRIPTION OF THE DRAWINGS

The present disclosure will become more fully understood from the following detailed description when taken in connection with the accompanying drawings, which show, for purpose of illustrations only, and thus do not limit other possible embodiments derived from the spirit of the present disclosure, and wherein:

FIG. 1B, FIG. 1C, FIG. 1D are schematic views of longitudinal spherical aberration curves, astigmatic field curves, and a distortion curve, respectively in the image lens system in FIG. 1A;

FIG. 3B, FIG. 3C, FIG. 3D are schematic views of longitudinal spherical aberration curves, astigmatic field curves, and a distortion curve, respectively in the image lens system in FIG. 3A;

FIG. 4B, FIG. 4C, FIG. 4D are schematic views of longitudinal spherical aberration curves, astigmatic field curves, and a distortion curve, respectively in the image lens system in FIG. 4A;

FIG. 6B, FIG. 6C, FIG. 6D are schematic views of longitudinal spherical aberration curves, astigmatic field curves, and a distortion curve, respectively in the image lens system in FIG. 6A;

FIG. 8B, FIG. 8C, FIG. 8D are schematic views of longitudinal spherical aberration curves, astigmatic field curves, and a distortion curve, respectively in the image lens system in FIG. 8A;

FIG. 9B, FIG. 9C, FIG. 9D are schematic views of longitudinal spherical aberration curves, astigmatic field curves, and a distortion curve, respectively in the image lens system in FIG. 9A;

FIG. 10B, FIG. 10C, FIG. 10D are schematic views of longitudinal spherical aberration curves, astigmatic field curves, and a distortion curve, respectively in the image lens system in FIG. 10A;

FIG. 11B, FIG. 11C, FIG. 11D are schematic views of longitudinal spherical aberration curves, astigmatic field curves, and a distortion curve, respectively in the image lens system in FIG. 11A.

DETAILED DESCRIPTION

Figure 1A:
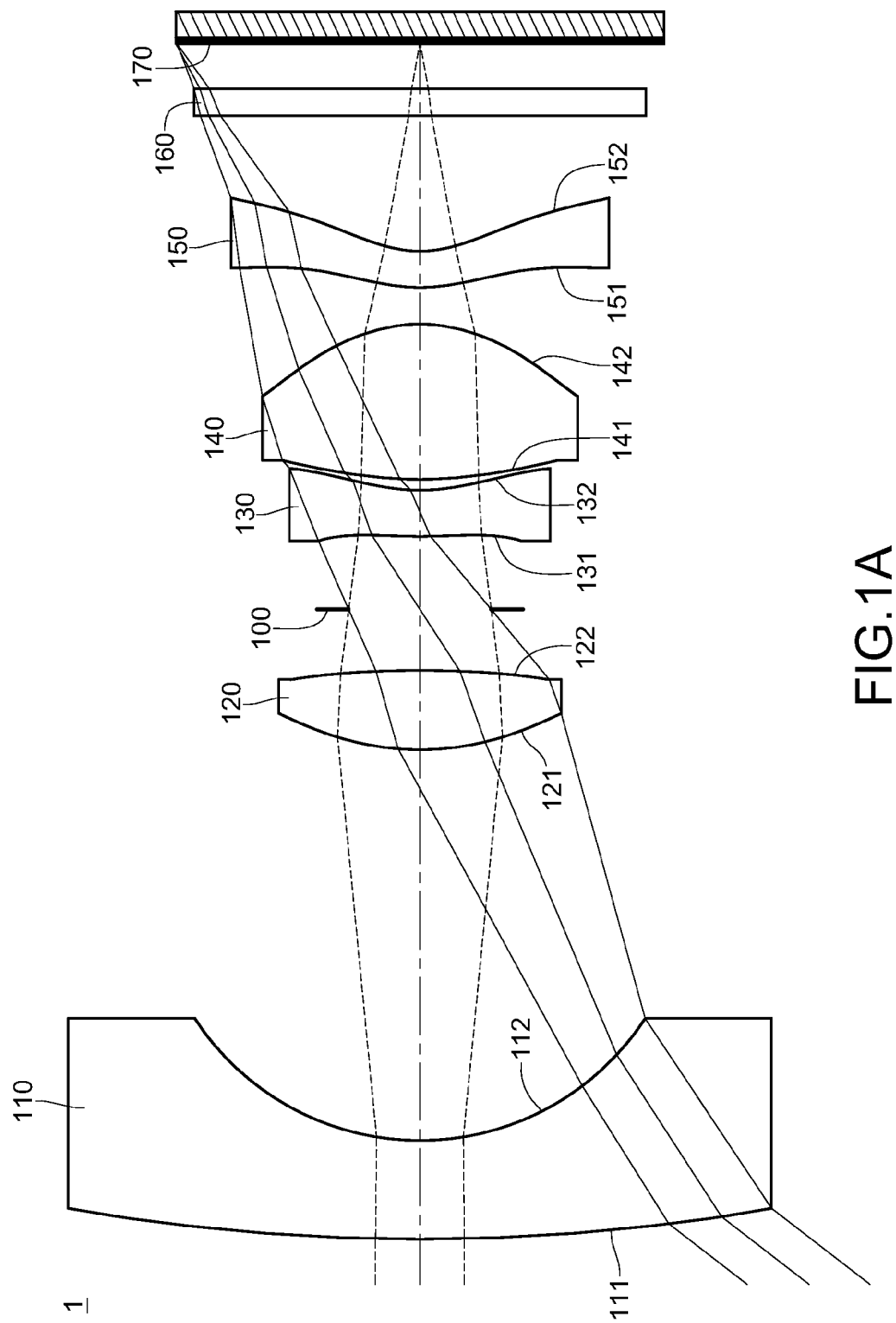
FIG. 1A is a schematic structural view of a first embodiment of an image lens system.
Figure 2A:
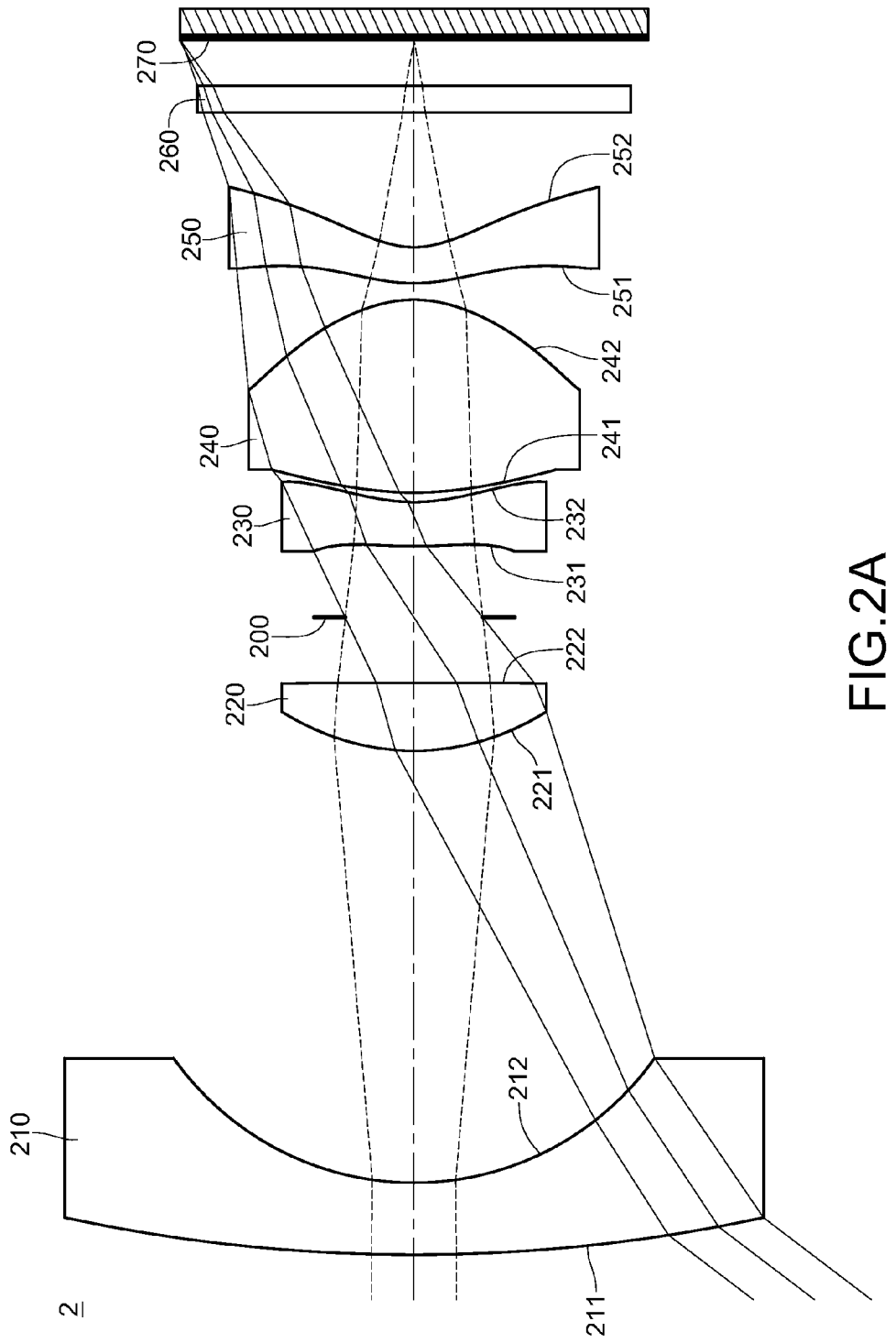
FIG. 2A is a schematic structural view of a second embodiment of an image lens system.
Figures 2B, 2C, 2D:
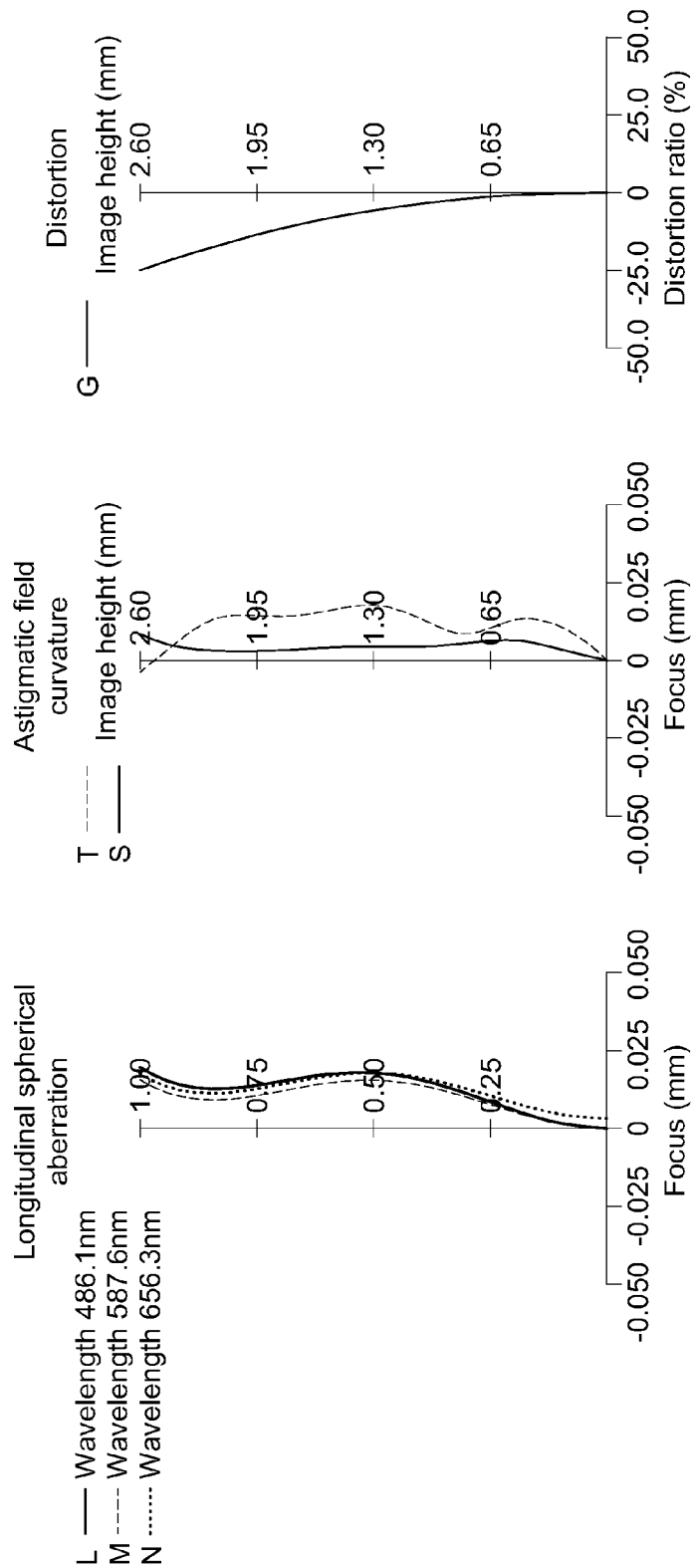
FIG. 2B, FIG. 2C, FIG. 2D are schematic views of longitudinal spherical aberration curves, astigmatic field curves, and a distortion curve, respectively in the image lens system in FIG. 2A.
Figure 3A:
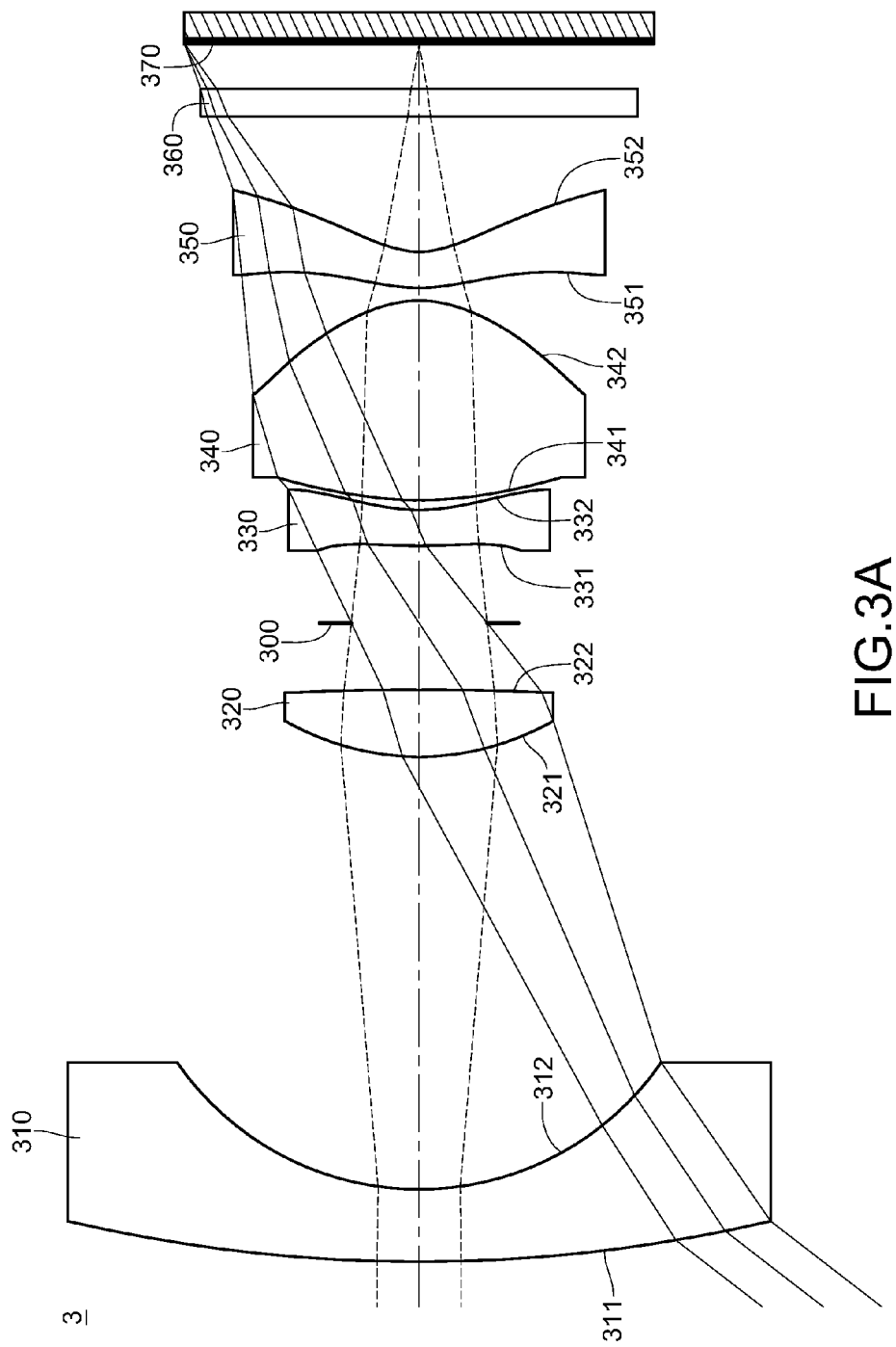
FIG. 3A is a schematic structural view of a third embodiment of an image lens system.
Figure 4A:
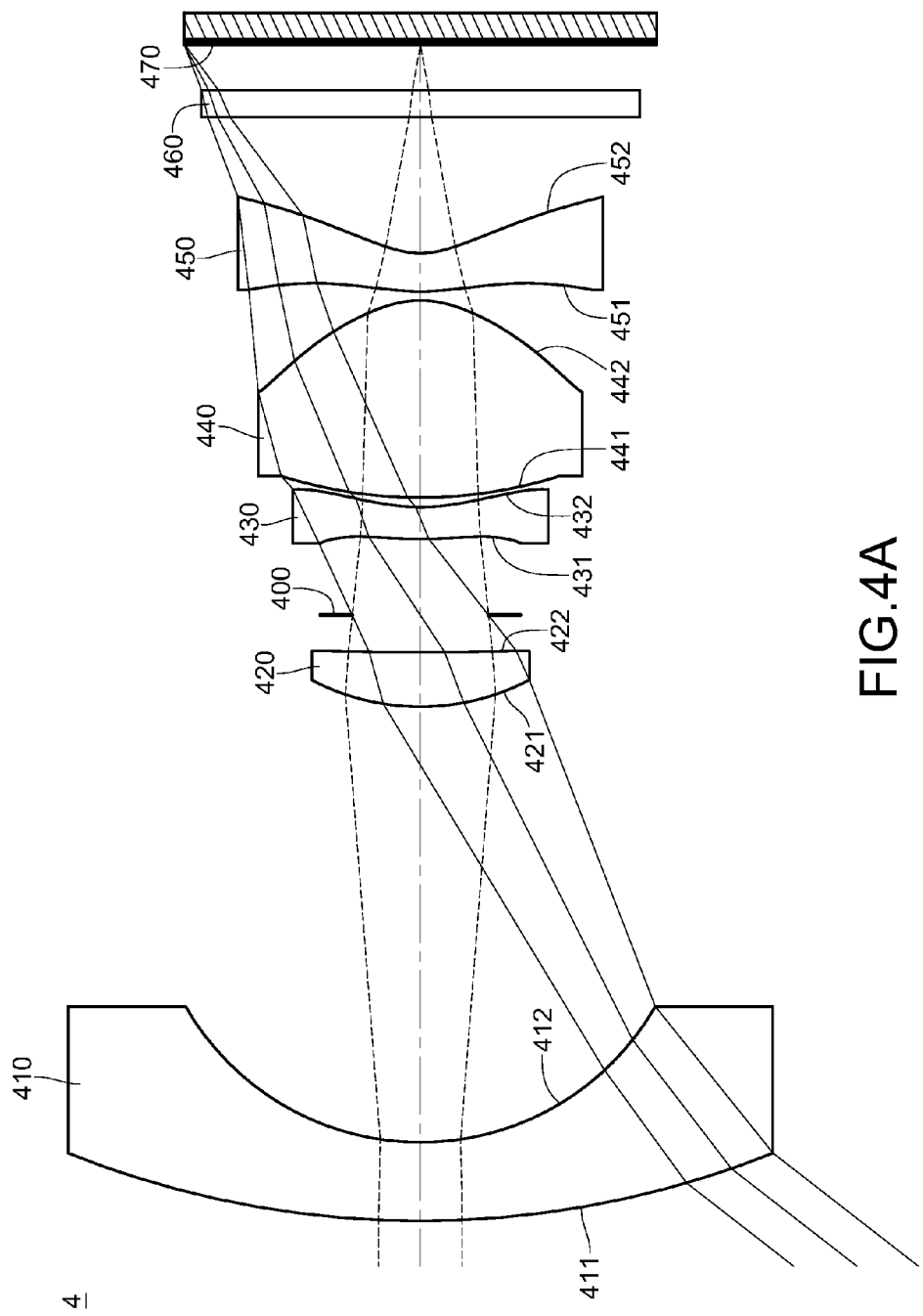
FIG. 4A is a schematic structural view of a fourth embodiment of an image lens system.
Figure 5A:
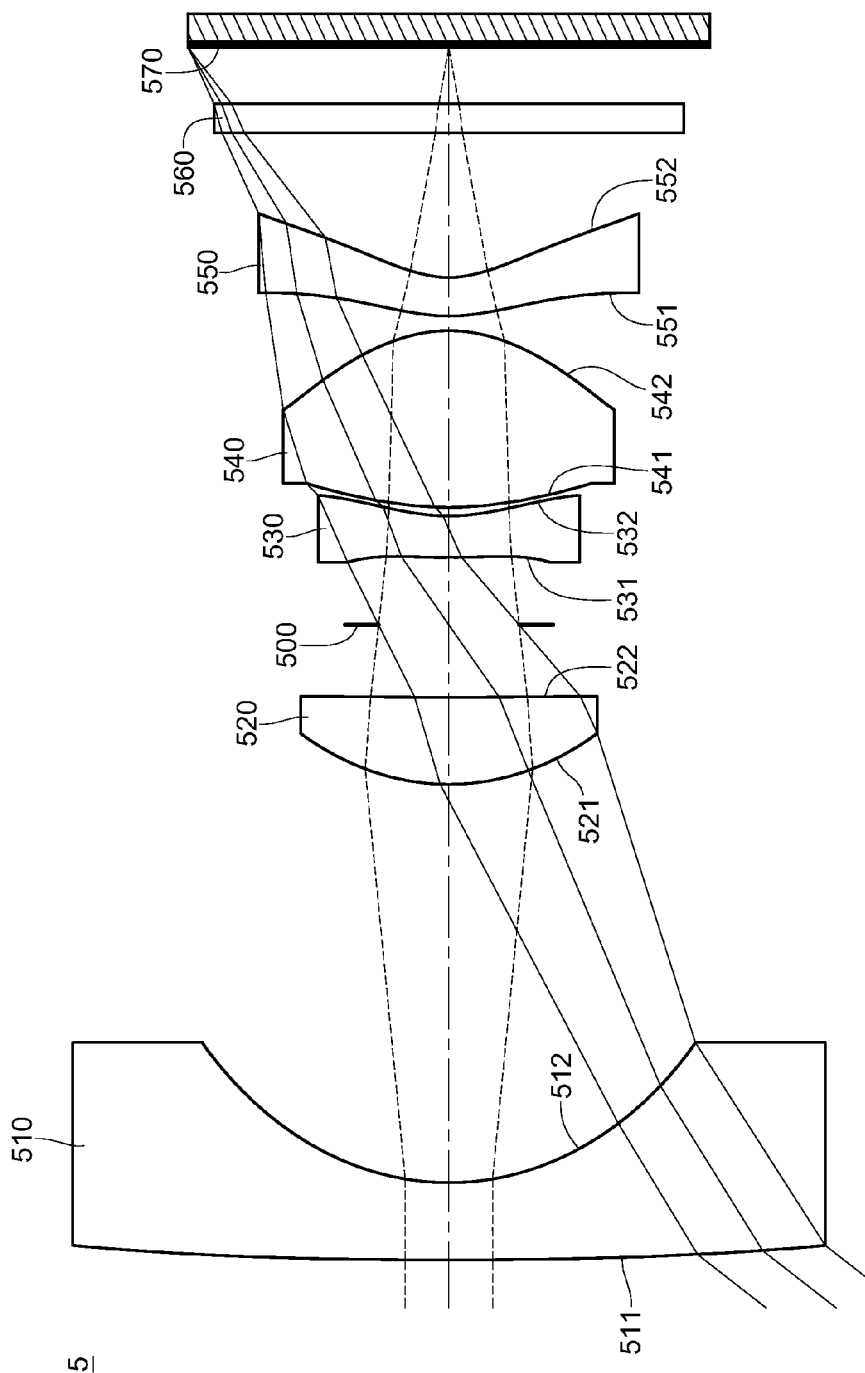
FIG. 5A is a schematic structural view of a fifth embodiment of an image lens system.
Figures 5B, 5C, 5D:
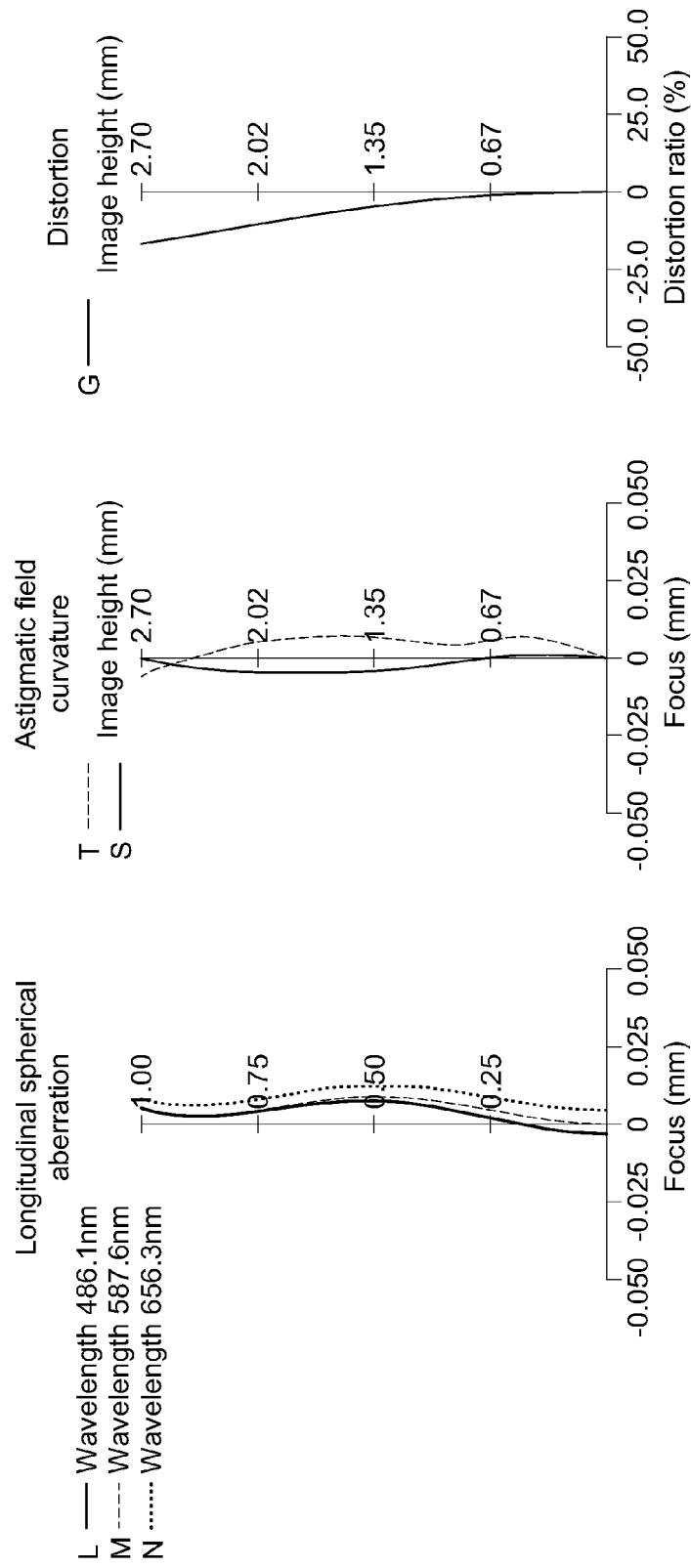
FIG. 5B, FIG. 5C, FIG. 5D are schematic views of longitudinal spherical aberration curves, astigmatic field curves, and a distortion curve, respectively in the image lens system in FIG. 5A.
Figure 6A:
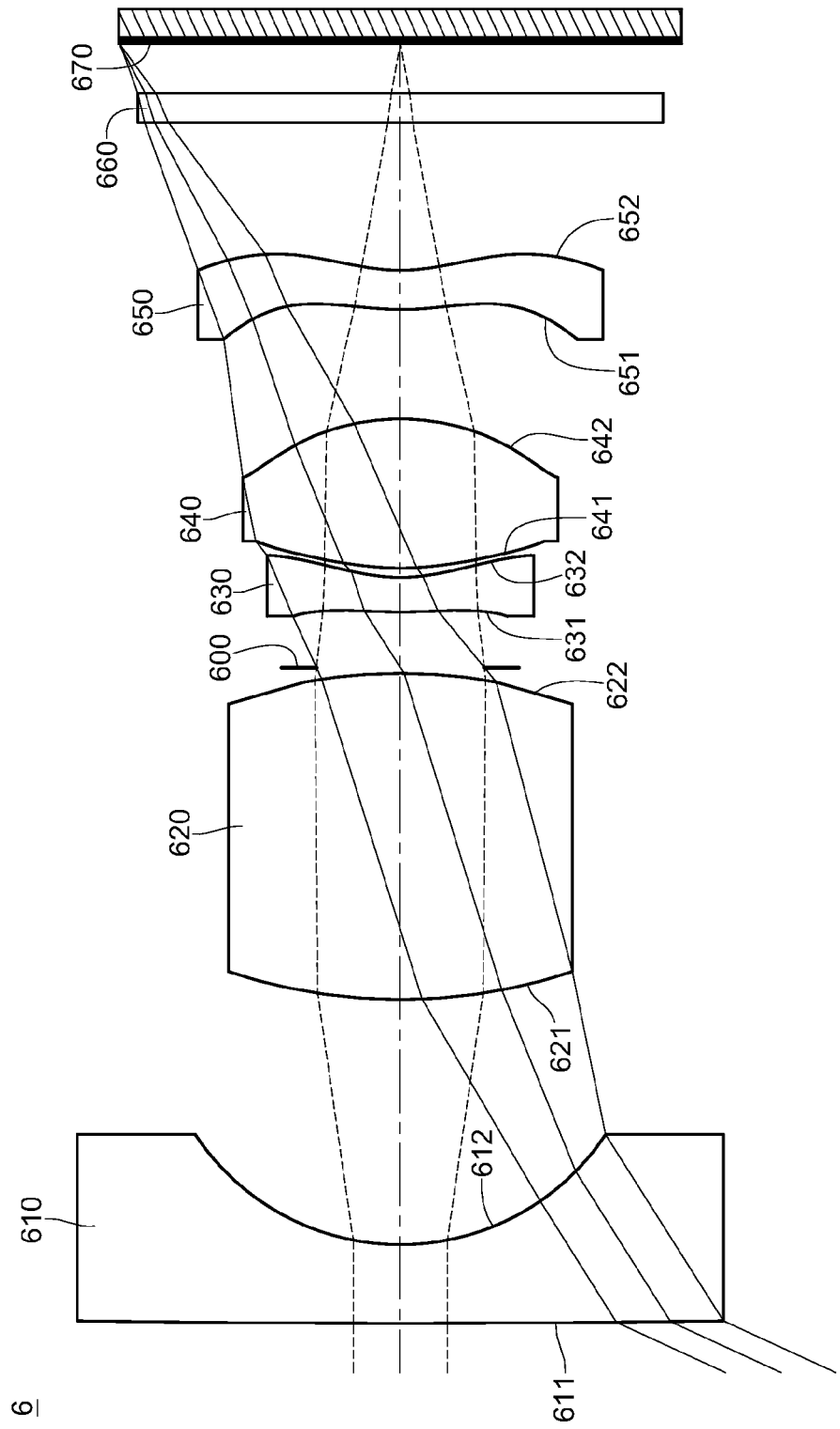
FIG. 6A is a schematic structural view of a sixth embodiment of an image lens system.
Figure 7A:
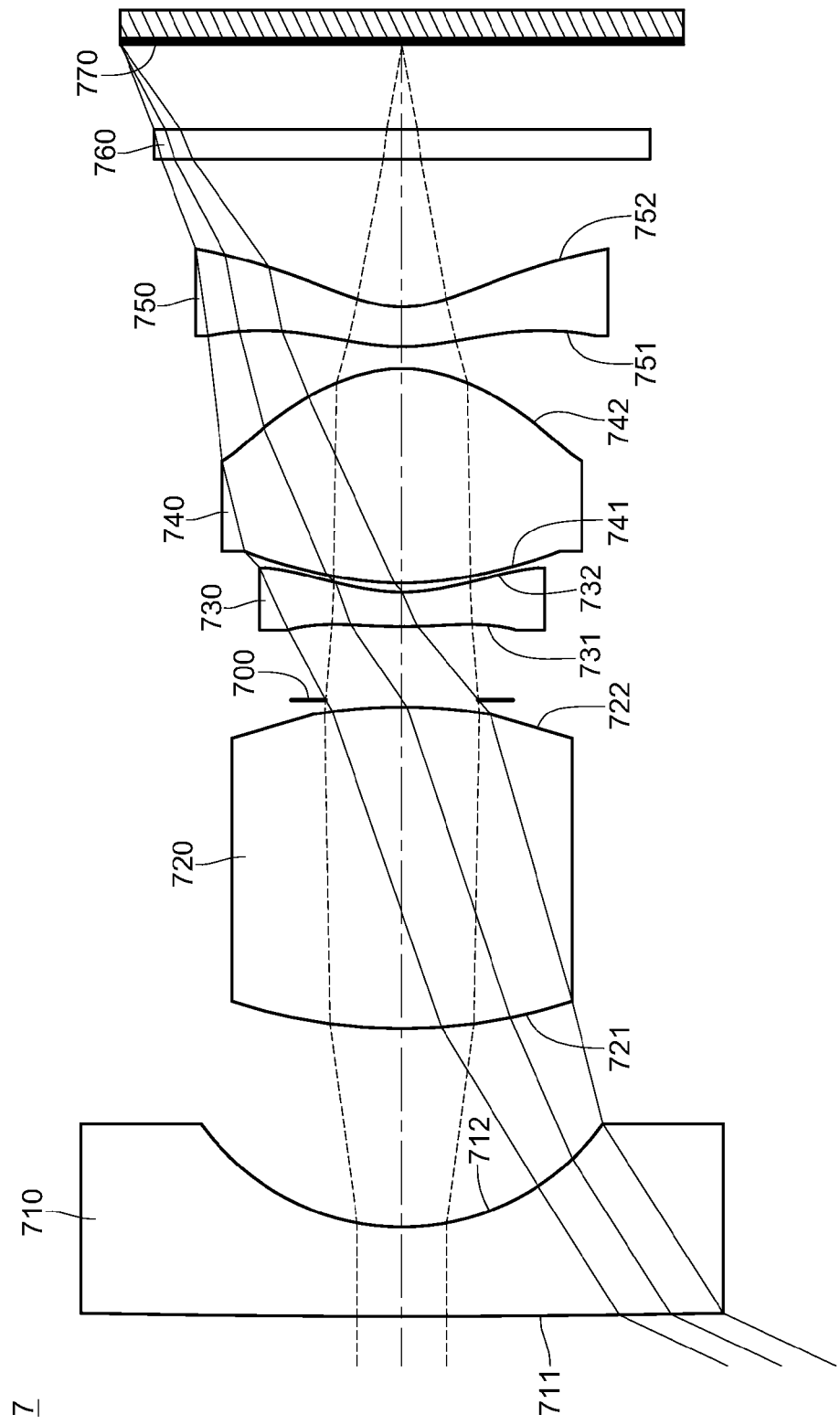
FIG. 7A is a schematic structural view of a seventh embodiment of an image lens system.
Figures 7B, 7C, 7D:
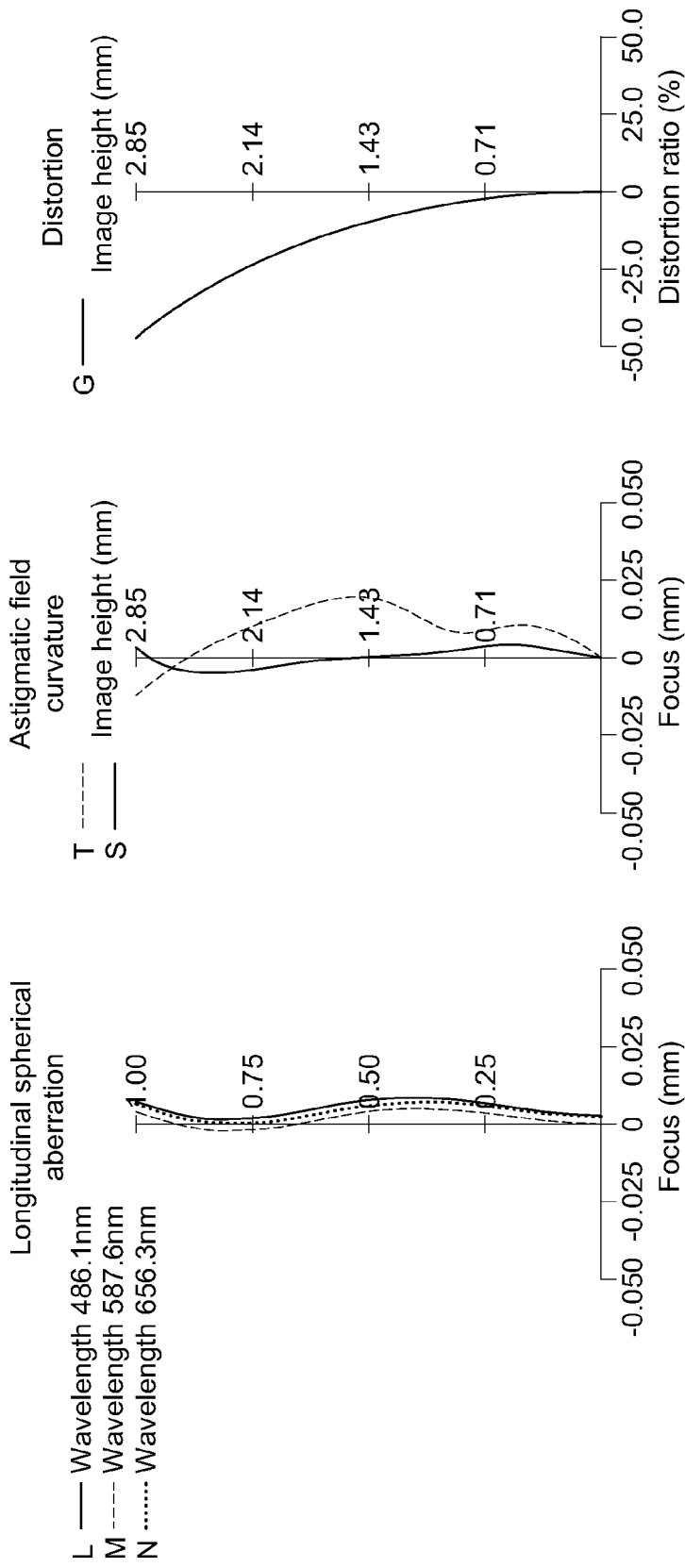
FIG. 7B, FIG. 7C, FIG. 7D are schematic views of longitudinal spherical aberration curves, astigmatic field curves, and a distortion curve, respectively in the image lens system in FIG. 7A.
Figure 8A:
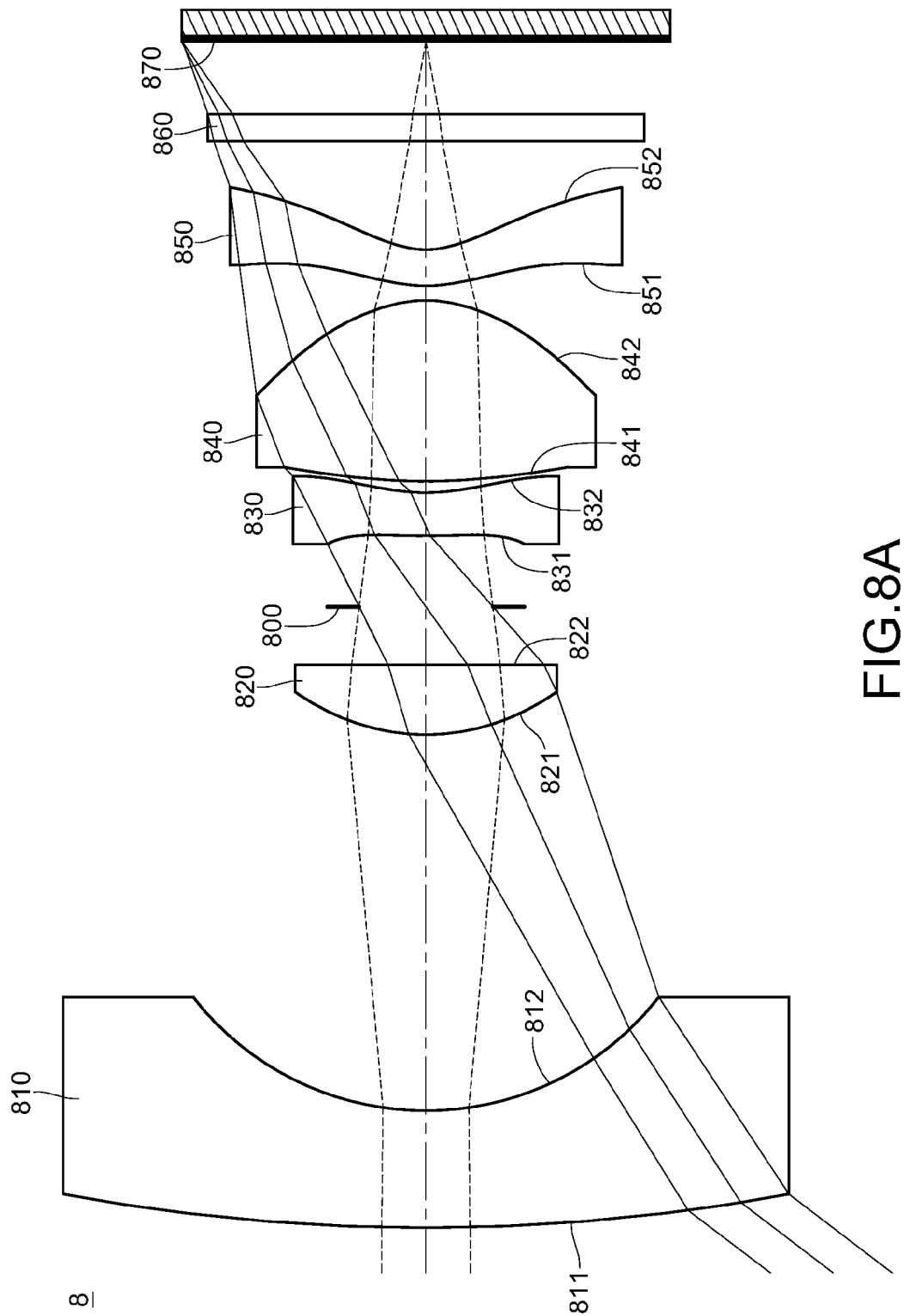
FIG. 8A is a schematic structural view of an eighth embodiment of an image lens system.
Figure 9A:
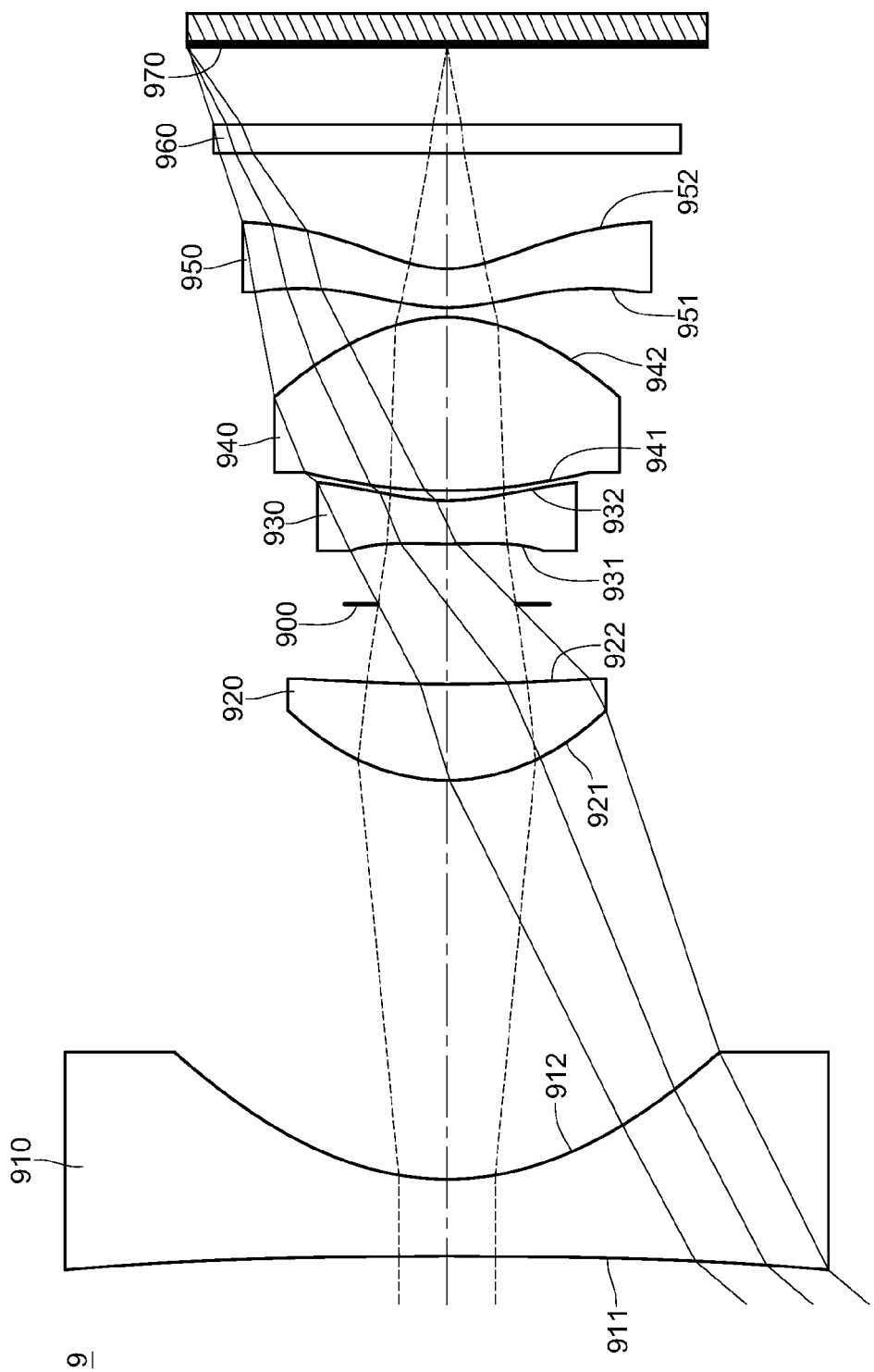
FIG. 9A is a schematic structural view of a ninth embodiment of an image lens system.
Figure 10A:
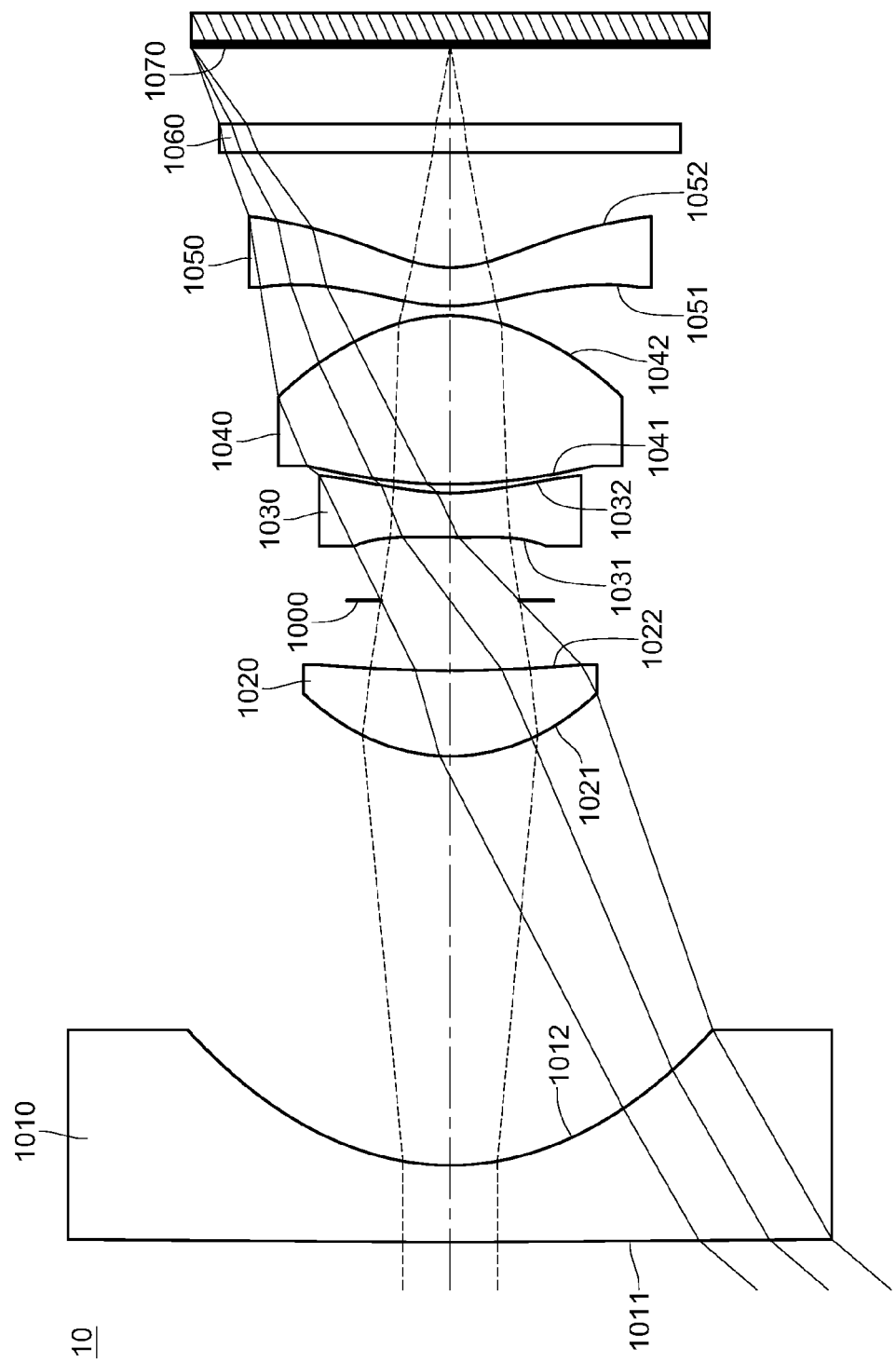
FIG. 10A is a schematic structural view of a tenth embodiment of an image lens system.
Figure 11A:
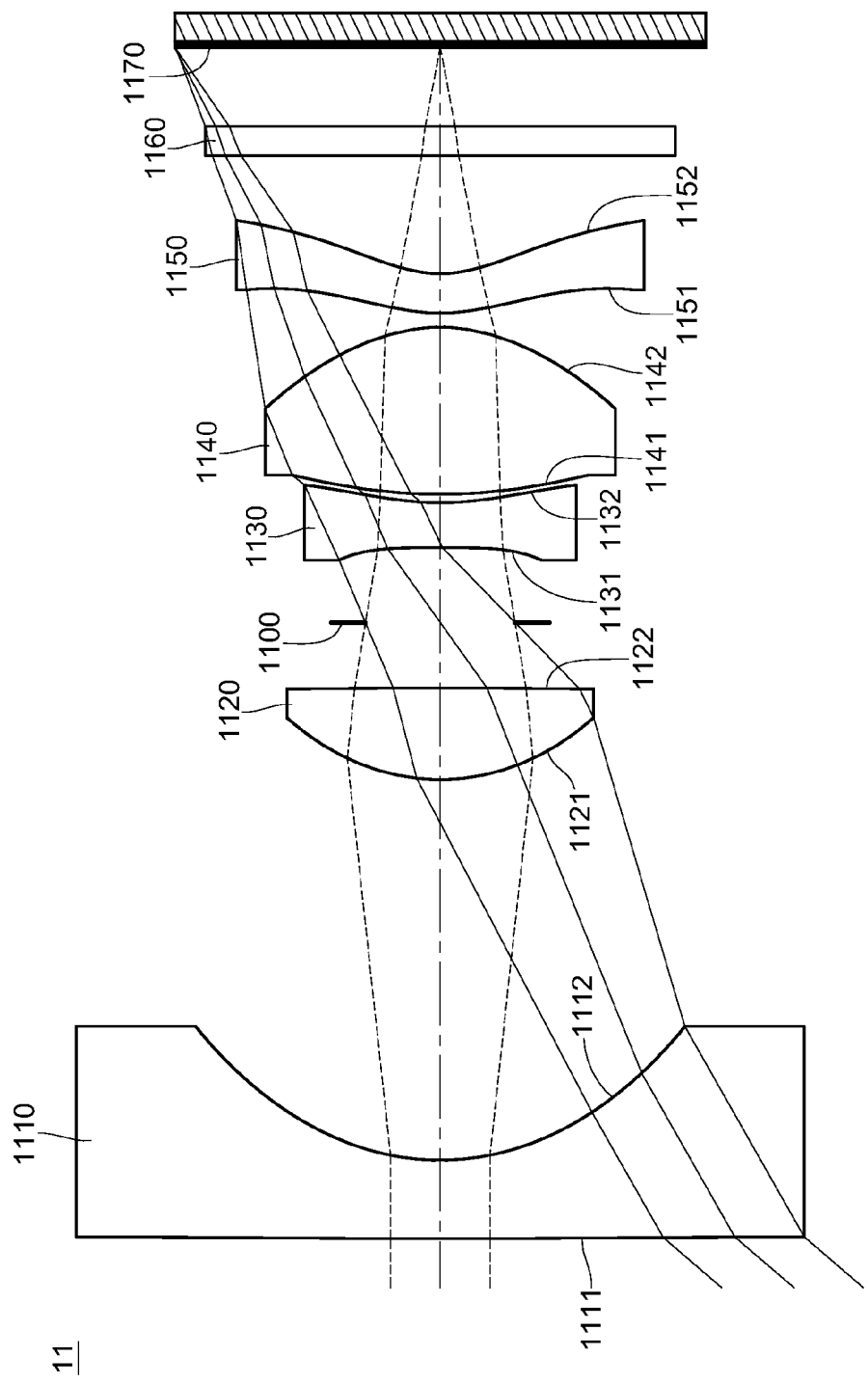
FIG. 11A is a schematic structural view of an eleventh embodiment of an image lens system.

The image lens system of the present disclosure is described with FIG. 1A as an example to illustrate that the embodiments have similar lens combinations, configuration relationships, and the same conditions of the optical lens assembly. The differences are described in detail in the following embodiments other than the embodiment described in FIG. 1.

The image lens system comprises, from an object side to an image side along an optical axis (from left to right in FIG. 1A) in sequence, a first lens element, a second lens element, a stop, a third lens element, a fourth lens element, a fifth lens element, an IR-cut filter (infrared-cut filter) and an image plane including an image sensor. The stop can be an aperture stop.

The object-side surface of the first lens element may be convex, and the image-side surface of the first lens element is concave. The refractive power of the first lens element is negative for expanding the field of view of the image lens system. The index of refraction of incident light is more moderate, so the excessive high aberration is avoided, thereby, achieving the balance between expanding the field of view and correcting the aberration.

The refractive power of the second lens element is positive for providing a portion of the overall refractive power and reducing the total length of the image lens system. The object-side surface and the image-side surface of the second lens element may both be convex and aspheric.

The refractive power of the third lens element is negative for correcting the aberration generated by the second lens element with positive refractive power and correcting the chromatism of the image lens system. The object-side surface of the third lens element may be convex and the image-side surface of the third lens element is concave. The object-side surface and the image-side surface of the third lens element both are aspheric.

The refractive power of the fourth lens element is positive for providing the main portion of the overall refractive power, reducing the total length of the image lens system, and maintaining the miniaturization. The object-side surface of the fourth lens element may be convex, and the image-side surface of the fourth lens element is convex.

The refractive power of the fifth lens element is negative, so a single lens element with excessively concentrated refractive power of the object-side lens elements with negative refractive power is avoided, thereby, reducing the photosensitivity of the image lens system and enhancing the imaging stability of the lenses during manufacturing, assembly and environmental testing. The object-side surface of the fifth lens element is convex and the image-side surface of the fifth lens element is concave, and the object-side surface and the image-side surface both are aspheric. Therefore, the fifth lens element having the convex-and-concave shape may be taken as a correction lens for correcting the astigmatism of the image lens system, and the fifth lens element also has at least one inflection point for effectively correcting the incident angle of off-axis light converged on the image sensor, and further correcting the off-axis aberration.

Moreover, the arrangement of each lens elements of the image lens system is alternated each lens elements with positive and negative refractive powers for reducing the aberration of the system with wide viewing angle.

The image lens system satisfies the following conditions:

$0 \leq R_6/|R_5| < 1.0$; (Condition 1):

$0.5(\text{mm}) < f/\tan(\text{HFOV}) < 3.0(\text{mm})$ (Condition 2):

wherein $R_5$ is the curvature radius of the object-side surface of the third lens element, $R_6$ is the curvature radius of the image-side surface of the third lens element, f is the focal length of the image lens system, and HFOV is a half of the maximal field of view in the image lens system.

When Condition 1 is satisfied, the astigmatism and the high order aberration of the image lens system are corrected, thereby, enhancing the resolution ability of the image lens system. When Condition 2 is satisfied, under the circumstances that the total length of image lens system is not too long, the image lens system has sufficient field of view.

The image lens system further satisfies the following conditions:

$|R_6/R_7|<0.9;$ (Condition 3):

$0 \leq R_3/|R_4| \leq 1.0;$ (Condition 4):

$1.5<(V_4+V_3)/(V_4-V_3)<3.0;$ (Condition 5):

$0<(R_7+R_8)/(R_7-R_8)<1.0;$ (Condition 6):

$0.30<f/f_{12}<1.0;$ (Condition 7):

$0<f_{12}/f_{345}<1.0$ (Condition 8):

wherein $R_7$ is the curvature radius of the object-side surface of the fourth lens element; $R_3$ is the curvature radius of the object-side surface of the second lens element; $R_4$ is the curvature radius of the image-side surface of the second lens element; $V_3$ is the Abbe number of the third lens element; $V_4$ is the Abbe number of the fourth lens element; $R_8$ is the curvature radius of the image-side surface of the fourth lens element; f is the focal length of the image lens system; $f_{12}$ is the composite focal length of the first lens element and the second lens element; and $f_{345}$ is the composite focal length of the third lens element, the fourth lens element and the fifth lens element.

When Condition 3 is satisfied, the lens shape of the image-side surface of the third lens element and that of the object-side surface of the fourth lens element are beneficial to correct the aberration of the image lens system. Satisfying Condition 4 is favorable for correcting the aberration generated by the first lens element, thereby, enhancing the image quality of the image lens system. Satisfying Condition 5 is beneficial to enhance the ability of correcting the chromatism. Satisfying Condition 6 is favorable for correcting the astigmatism generated by the image lens system. Satisfying Condition 7 is beneficial to lower the photosensitivity of the image lens system for enhancing the image quality. When Condition 8 is satisfied, because the first lens element and the second lens element have stronger negative refractive power, superior characteristic of wide viewing angle is provided, and because the third lens element, the fourth lens element and the fifth lens element have stronger positive refractive power, the total optical length is reduced and the aberration is corrected. Therefore, the allocation of the refractive powers is favorable for providing superior characteristic of wide viewing angle and ability of correcting the chromatism.

$0.3<R_2/T_{12}<1.6;$ (Condition 9):

$1.7<(R_9+R_{10})/(R_9-R_{10})<5.3;$ (Condition 10):

$80(\text{degrees;deg.})<FOV<160(\text{deg.});$ and (Condition 11):

$0.15<Dr_5r_{10}/TD<0.40$ (Condition 12):

wherein $R_2$ is the curvature radius of the image-side surface of the first lens element; $T_{12}$ is the axial distance between the first lens element and the second lens element; $R_9$ is the curvature radius of the object-side surface of the fifth lens element; $R_{10}$ is the curvature radius of the image-side surface of the fifth lens element; FOV the maximal field of view in the image lens system; $Dr_5r_{10}$ is the axial distance between the object-side surface of the third lens element and the image-side surface of the fifth lens element; and TD is the axial distance between the object-side surface of the first lens element and the image-side surface of the fifth lens element.

Satisfying Condition 9 is favorable for providing the larger field of view. Satisfying Condition 10 is favorable for correcting the astigmatism generated by the image lens system. When Condition 11 is satisfied, the image lens system may obtain the larger field of view. Satisfying Condition 12 is favorable for making the arrangement of the third lens element, the fourth lens element and the fifth lens element tightly and closely, thereby, enhancing the miniaturization.

In addition, in the image lens system, a convex surface means the surface at a paraxial site is convex; a concave surface means the surface at a paraxial site is concave.

As for the image lens system, the specific schemes are further described with the following embodiments. Parameters in the embodiments are defined as follows. The aspheric surface in the embodiments may be represented by, but not limited to, the following aspheric surface equation (Formula ASP):

$$X(Y) = (Y^2/R)/(1 + \text{sqrt}(1-(1+k)*(Y/R)^2)) + \sum_i (Ai)*(Y^i)$$

wherein X is the distance of a point on the aspheric surface at a distance Y away from the optical axis relative to the tangential plane at the aspheric surface vertex, Y is the distance from the point on the curve of the aspheric surface to the optical axis, k is a conic factor, Ai is an $i^{th}$ order aspheric surface coefficient, and in the embodiments, i may be, but is not limited to, 4, 6, 7, 8, 10, 12 and 14.

The First Embodiment (Embodiment 1)

Referring to FIGS. 1A to 1D, the image lens system 1 of the first embodiment comprises, from an object side to an image side along an optical axis (from left to right in FIG. 1A) in sequence, a first lens element 110, a second lens element 120, an aperture stop 100, a third lens element 130, a fourth lens element 140, a fifth lens element 150, an IR-cut filter (infrared-cut filter) 160 and an image plane 170 including an image sensor.

The first lens element 110 with negative refractive power has a convex object-side surface 111 and a concave image-side surface 112. The second lens element 120 with positive refractive power has an aspheric convex object-side surface 121 and an aspheric convex image-side surface 122. The third lens element 130 with negative refractive power has an aspheric convex object-side surface 131 and an aspheric concave image-side surface 132. The fourth lens element 140 with positive refractive power has an aspheric convex object-side surface 141 and an aspheric convex image-side surface 142. The fifth lens element 150 with negative refractive power has an aspheric convex object-side surface 151 and an aspheric concave image-side surface 152. The fifth lens element 150 has at least one inflection point on at least one of the object-side surface 151 and the image-side surface 152.

In this embodiment, the reference wavelength of the incident light ray on the image lens system 1 is 587.6 nm. However, the reference wavelength of the light does not intend to limit the disclosure. In some embodiments, light with different wavelength can be utilized for demonstrations of different purposes.

The detailed data of the image lens system 1 is as shown in Table 1-1 below:

TABLE 1-1

Embodiment 1
f = 2.75 mm, Fno = 2.80, HFOV = 52.3 deg.

| Surface # | | Curvature radius(mm) | Thickness (mm) | Material | Index | Abbe # | Focal length (mm) |
|---|---|---|---|---|---|---|---|
| 0 | Object | — | Plano Infinity | — | — | — | — |
| 1 | Lens 1 | 22.325 | — 1.093 | Glass | 1.678 | 55.2 | −5.18 |
| 2 | | 2.973 | — 4.330 | — | — | — | — |
| 3 | Lens 2 | 3.032 | ASP 0.878 | Glass | 1.566 | 61.1 | 4.38 |
| 4 | | −12.107 | ASP 0.675 | — | — | — | — |
| 5 | Ape. Stop | — | Plano 0.811 | — | — | — | — |
| 6 | Lens 3 | 7.217 | ASP 0.510 | Plastic | 1.640 | 23.3 | −4.76 |
| 7 | | 2.084 | ASP 0.121 | — | — | — | — |
| 8 | Lens 4 | 4.781 | ASP 1.719 | Plastic | 1.535 | 56.3 | 2.60 |
| 9 | | −1.717 | ASP 0.407 | — | — | — | — |
| 10 | Lens 5 | 1.976 | ASP 0.400 | Plastic | 1.640 | 23.3 | −6.02 |
| 11 | | 1.203 | ASP 1.500 | — | — | — | — |
| 12 | IR-cut filter | — | Plano 0.300 | Glass | 1.516 | 64.1 | — |
| 13 | | — | Plano 0.502 | — | — | — | — |
| 14 | Image Plane | — | Plano — | — | — | — | — |

Note:
Reference wavelength is d-line 587.6 nm, and ASP represents aspheric.

In Table 1-1, from the object-side surface 111 to the image-side surface 152, all the surfaces can be aspheric, and the aspheric surfaces can satisfy Formula ASP, but are not limited thereto. As for the parameters of the aspheric surfaces, reference is made to Table 1-2 below:

TABLE 1-2

Aspheric Coefficients

| | Surface# | | | | | | |
|---|---|---|---|---|---|---|---|
| 3 | 4 | 7 | 6 | 8 | 9 | 10 | 11 |
| k = −4.3133E−01 | 5.1742E+00 | −9.7246E+00 | 3.4435E+01 | 3.7238E+00 | −1.6665E+00 | −5.2403E+00 | −3.0543E+00 |
| A4 = 1.4808E−05 | −1.9749E−03 | 1.3191E−02 | −1.1940E−01 | −7.8934E−03 | 6.5244E−03 | −4.8051E−02 | −5.4361E−02 |
| A6 = −7.5186E−04 | −1.6115E−03 | −3.8968E−02 | 5.3699E−02 | −7.3752E−03 | −1.4745E−02 | 1.6131E−03 | 1.2741E−02 |
| A8 = −6.4032E−05 | 4.8524E−04 | 2.4324E−02 | −9.2251E−02 | 3.5402E−03 | 5.4898E−03 | 3.3590E−03 | −1.4690E−03 |
| A10 = −3.8527E−05 | −6.6488E−05 | −7.4516E−03 | 8.3770E−02 | −6.3173E−04 | −3.8153E−04 | −8.4176E−04 | 7.0942E−05 |
| A12 = — | — | 7.8855E−04 | −3.7606E−02 | 2.8018E−05 | −2.5452E−04 | 6.5627E−05 | 1.0735E−07 |
| A14 = — | — | — | 4.0370E−03 | — | 6.5795E−05 | — | — |

In Table 1-1, the curvature radius, the thickness and the focal length are shown in millimeters (mm). Surface numbers 0-14 represent the surfaces sequentially arranged from the object-side to the image-side along the optical axis. "f" stands for the focal length, "Fno" is the f-number, and "HFOV" is a half of maximal field of view of this embodiment. In Table 1-2, k represents the conic coefficient of the equation of the aspheric surface profiles. A1-A14 represent the aspheric coefficients ranging from the $1^{st}$ order to the $14^{th}$ order. All labels for Tables of the remaining embodiments share the same definitions as those in Table 1-1 and Table 1-2 of the first embodiment, and their definitions will not be stated again.

The content of Table 1-3 may be deduced from Table 1-1:

TABLE 1-3

Embodiment 1

| f (mm) | 2.75 | $(R_7 + R_8)/R_7 − R_8)$ | 0.47 |
|---|---|---|---|
| Fno | 2.80 | $(R_9 + R_{10})/(R_9 − R_{10})$ | 4.11 |
| HFOV(deg.) | 52.3 | $f/f_{12}$ | 0.62 |
| $(V_4 + V_3)/(V_4 − V_3)$ | 2.41 | $f_{12}/f_{345}$ | 0.49 |
| $R_2/T_{12}$ | 0.69 | FOV(deg.) | 104.5 |
| $R_3/|R_4|$ | 0.25 | f/tan(HFOV)(mm) | 2.13 |

TABLE 1-3-continued

Embodiment 1

| $R_6/|R_5|$ | 0.29 | $Dr_5r_{10}/TD$ | 0.29 |
|---|---|---|---|
| $|R_6/R_7|$ | 0.44 | — | — |

The Second Embodiment (Embodiment 2)

Referring to FIGS. 2A to 2D, the image lens system 2 of the second embodiment comprises, from an object side to an image side along an optical axis in sequence, a first lens element 210, a second lens element 220, an aperture stop 200, a third lens element 230, a fourth lens element 240, a fifth lens element 250, an IR-cut filter 260 and an image plane 270 including an image sensor.

The first lens element 210 with negative refractive power has a convex object-side surface 211 and a concave image-side surface 212. The second lens element 220 with positive refractive power has an aspheric convex object-side surface 221 and an aspheric concave image-side surface 222. The third lens element 230 with negative refractive power has an aspheric convex object-side surface 231 and an aspheric concave image-side surface 232. The fourth lens element 240 with positive refractive power has an aspheric convex object-side surface 241 and an aspheric convex image-side surface 242. The fifth lens element 250 with negative refractive power has an aspheric convex object-side surface 251 and an aspheric concave image-side surface 252. The fifth lens element 250 has at least one inflection point on at least one of the object-side surface 251 and the image-side surface 252.

The detailed data of the image lens system 2 is as shown in Table 2-1 below:

TABLE 2-1

Embodiment 2
f = 2.65 mm, Fno = 2.80, HFOV = 52.7 deg.

| Surface # | | Curvature radius (mm) | Thickness (mm) | Material | Index | Abbe # | Focal length (mm) |
|---|---|---|---|---|---|---|---|
| 0 | Object | — | Plano | Infinity | — | — | — |
| 1 | Lens 1 | 18.441 | — | 0.800 | Glass | 1.729 | 54.5 | -5.57 |
| 2 | | 3.267 | — | 4.805 | — | — | — | — |
| 3 | Lens 2 | 2.656 | ASP | 0.753 | Glass | 1.566 | 61.1 | 4.80 |
| 4 | | 109.769 | ASP | 0.728 | — | — | — | — |
| 5 | Ape. Stop | — | Plano | 0.794 | — | — | — | — |
| 6 | Lens 3 | 5.821 | ASP | 0.490 | Plastic | 1.634 | 23.8 | -5.03 |
| 7 | | 1.992 | ASP | 0.106 | — | — | — | — |
| 8 | Lens 4 | 3.929 | ASP | 2.145 | Plastic | 1.535 | 56.3 | 2.23 |
| 9 | | -1.385 | ASP | 0.183 | — | — | — | — |
| 10 | Lens 5 | 1.771 | ASP | 0.400 | Plastic | 1.634 | 23.8 | -3.70 |
| 11 | | 0.921 | ASP | 1.500 | — | — | — | — |
| 12 | IR-cut filter | — | Plano | 0.300 | Glass | 1.516 | 64.1 | — |
| 13 | | — | Plano | 0.500 | — | — | — | — |
| 14 | Image Plane | — | Plano | — | — | — | — | — |

Note:
Reference wavelength is d-line 587.6 nm, and ASP represents aspheric.

As for the parameters of the aspheric surfaces, reference is made to Table 2-2 below.

TABLE 2-2

Aspheric Coefficients

| | Surface# | | | | | | |
|---|---|---|---|---|---|---|---|
| | 3 | 4 | 6 | 7 | 8 | 9 | 10 | 11 |
| k = | -1.4853E-01 | 2.0000E+01 | 2.2846E+01 | -8.5141E+00 | 2.1378E+00 | -2.5318E+00 | -9.5541E+00 | -3.5657E+00 |
| A4 = | 1.2076E-03 | -8.7245E-04 | -1.2998E-01 | 6.7796E-03 | -1.4569E-02 | -4.1291E-03 | -3.9018E-02 | -4.3475E-02 |
| A6 = | -5.0871E-04 | -3.1149E-03 | 4.7262E-02 | -3.8898E-02 | -7.3150E-03 | -1.5856E-02 | 2.7215E-04 | 1.1026E-02 |
| A8 = | -3.6225E-04 | 1.1783E-03 | -9.4625E-02 | 2.4543E-02 | 3.5136E-03 | 5.8273E-03 | 3.1795E-03 | -1.4845E-03 |
| A10 = | 9.0772E-05 | -1.2602E-04 | 8.3623E-02 | -7.7133E-03 | -5.4383E-04 | -3.9339E-04 | -8.3969E-04 | 8.0148E-05 |
| A12 = | — | — | -3.6217E-02 | 8.3671E-04 | 1.6707E-05 | -2.6840E-04 | 7.4218E-05 | 1.5283E-06 |
| A14 = | — | — | 1.4518E-03 | — | — | 6.0433E-05 | — | — |

The content of Table 2-3 may be deduced from Table 2-1.

TABLE 2-3

Embodiment 2

| f (mm) | 2.65 | $(R_7 + R_8)/R_7 - R_8)$ | 0.48 |
|---|---|---|---|
| Fno | 2.80 | $(R_9 + R_{10})/(R_9 - R_{10})$ | 3.16 |
| HFOV(deg.) | 52.7 | $f/f_{12}$ | 0.54 |
| $(V_4 + V_3)/(V_4 - V_3)$ | 2.47 | $f_{12}/f_{345}$ | 0.67 |
| $R_2/T_{12}$ | 0.68 | FOV(deg.) | 105.5 |
| $R_3/|R_4|$ | 0.02 | f/tan(HFOV)(mm) | 2.01 |
| $R_6/|R_5|$ | 0.34 | $Dr_5r_{10}/TD$ | 0.30 |
| $|R_6/R_7|$ | 0.51 | — | — |

The Third Embodiment (Embodiment 3)

Referring to FIGS. 3A to 3D, the image lens system 3 of the third embodiment comprises, from an object side to an image side along an optical axis in sequence, a first lens element 310, a second lens element 320, an aperture stop 300, a third lens element 330, a fourth lens element 340, a fifth lens element 350, an IR-cut filter 360 and an image plane 370 including an image sensor.

The first lens element 310 with negative refractive power has a convex object-side surface 311 and a concave image-side surface 312. The second lens element 320 with positive refractive power has an aspheric convex object-side surface 321 and an aspheric convex image-side surface 322. The third lens element 330 with negative refractive power has an aspheric convex object-side surface 331 and an aspheric concave image-side surface 332. The fourth lens element 340 with positive refractive power has an aspheric convex object-side surface 341 and an aspheric convex image-side surface 342. The fifth lens element 350 with negative refractive power has an aspheric convex object-side surface 351 and an aspheric concave image-side surface 352. The fifth lens element 350 has at least one inflection point on at least one of the object-side surface 351 and the image-side surface 352.

The detailed data of the image lens system 3 is as shown in Table 3-1 below.

TABLE 3-1

Embodiment 3
f = 2.60 mm, Fno = 2.80, HFOV = 52.3 deg.

| Surface # | | Curvature radius (mm) | | Thickness (mm) | Material | Index | Abbe # | Focal length (mm) |
|---|---|---|---|---|---|---|---|---|
| 0 | Object | — | Plano | Infinity | — | — | — | — |
| 1 | Lens 1 | 17.056 | — | 0.800 | Glass | 1.729 | 54.5 | −5.65 |
| 2 | | 3.251 | — | 4.790 | — | — | — | — |
| 3 | Lens 2 | 2.936 | ASP | 0.744 | Glass | 1.566 | 61.1 | 4.82 |
| 4 | | −34.860 | ASP | 0.737 | — | — | — | — |
| 5 | Ape. Stop | — | Plano | 0.855 | — | — | — | — |
| 6 | Lens 3 | 5.679 | ASP | 0.398 | Plastic | 1.634 | 23.8 | −5.25 |
| 7 | | 2.042 | ASP | 0.107 | — | — | — | — |
| 8 | Lens 4 | 4.256 | ASP | 2.210 | Plastic | 1.535 | 56.3 | 2.09 |
| 9 | | −1.239 | ASP | 0.141 | — | — | — | — |
| 10 | Lens 5 | 1.794 | ASP | 0.400 | Plastic | 1.634 | 23.8 | −3.09 |
| 11 | | 0.856 | ASP | 1.500 | — | — | — | — |
| 12 | IR-cut filter | — | Plano | 0.300 | Glass | 1.516 | 64.1 | — |
| 13 | | — | Plano | 0.499 | — | — | — | — |
| 14 | Image Plane | — | Plano | — | — | — | — | — |

Note:
Reference wavelength is d-line 587.6 nm, and ASP represents aspheric.

As for the parameters of the aspheric surfaces, reference is made to Table 3-2 below.

TABLE 3-2

Aspheric Coefficients

| | Surface# | | | | | | |
|---|---|---|---|---|---|---|---|
| | 3 | 4 | 6 | 7 | 8 | 9 | 10 | 11 |
| k = | −1.1825E−01 | −9.9000E+01 | 2.0076E+01 | −9.0158E+00 | 2.8729E+00 | −2.8296E+00 | −1.2938E+01 | −3.8730E+00 |
| A4 = | 9.7922E−04 | 1.3807E−04 | −1.3171E−01 | 6.6993E−03 | −1.0205E−02 | −1.1686E−02 | −3.3244E−02 | −3.8671E−02 |
| A6 = | −3.2352E−04 | −3.0453E−03 | 4.8699E−02 | −3.8658E−02 | −6.9883E−03 | −1.4402E−02 | −7.5881E−04 | 1.0310E−02 |
| A8 = | −4.9748E−04 | 1.2261E−03 | −9.0755E−02 | 2.4878E−02 | 3.4388E−03 | 5.9337E−03 | 3.2506E−03 | −1.5463E−03 |
| A10 = | 1.6031E−04 | −1.1939E−04 | 8.1463E−02 | −7.6622E−03 | −5.8933E−04 | −4.4457E−04 | −8.4445E−04 | 1.0808E−04 |
| A12 = | — | — | −3.6914E−02 | 7.6406E−04 | 2.0920E−05 | −2.7810E−04 | 7.4383E−05 | −1.0436E−06 |
| A14 = | — | — | 3.6489E−03 | — | — | 6.4104E−05 | — | — |

The content of Table 3-3 may be deduced from Table 3-1.

TABLE 3-3

Embodiment 3

| f (mm) | 2.60 | $(R_7 + R_8)/R_7 - R_8)$ | 0.55 |
|---|---|---|---|
| Fno | 2.80 | $(R_9 + R_{10})/(R_9 - R_{10})$ | 2.82 |
| HFOV(deg.) | 52.3 | $f/f_{12}$ | 0.53 |
| $(V_4 + V_3)/(V_4 - V_3)$ | 2.47 | $f_{12}/f_{345}$ | 0.71 |
| $R_2/T_{12}$ | 0.68 | FOV(deg.) | 104.7 |
| $R_3/|R_4|$ | 0.08 | f/tan(HFOV)(mm) | 2.01 |
| $R_6/|R_5|$ | 0.36 | $Dr_5r_{10}/TD$ | 0.29 |
| $|R_6/R_7|$ | 0.48 | | |

The Fourth Embodiment (Embodiment 4)

Referring to FIGS. 4A to 4D, the image lens system 4 of the fourth embodiment comprises, from an object side to an image side along an optical axis in sequence, a first lens element 410, a second lens element 420, an aperture stop 400, a third lens element 430, a fourth lens element 440, a fifth lens element 450, an IR-cut filter 460 and an image plane 470 including an image sensor.

The first lens element 410 with negative refractive power has a convex object-side surface 411 and a concave image-side surface 412. The second lens element 420 with positive refractive power has an aspheric convex object-side surface 421 and an aspheric concave image-side surface 422. The third lens element 430 with negative refractive power has an aspheric convex object-side surface 431 and an aspheric concave image-side surface 432. The fourth lens element 440 with positive refractive power has an aspheric convex object-side surface 441 and an aspheric convex image-side surface 442. The fifth lens element 450 with negative refractive power has an aspheric convex object-side surface 451 and an aspheric concave image-side surface 452. The fifth lens element 450 has at least one inflection point on at least one of the object-side surface 451 and the image-side surface 452.

The detailed data of the image lens system 4 is as shown in Table 4-1 below.

TABLE 4-1

Embodiment 4
f = 2.57 mm, Fno = 2.80, HFOV = 52.1 deg.

| Surface# | | Curvature radius (mm) | Thickness (mm) | Material | Index | Abbe # | Focal length (mm) |
|---|---|---|---|---|---|---|---|
| 0 | Object | — | Plano | Infinity | — | — | — |
| 1 | Lens 1 | 10.431 | — | 0.865 | Glass | 1.729 | 54.5 | -6.02 |
| 2 | | 2.980 | — | 4.800 | | | | |
| 3 | Lens 2 | 2.641 | ASP | 0.602 | Glass | 1.566 | 61.1 | 4.92 |
| 4 | | 47.054 | ASP | 0.405 | — | — | — | — |
| 5 | Ape. Stop | — | Plano | 0.842 | — | — | — | — |
| 6 | Lens 3 | 4.906 | ASP | 0.350 | Plastic | 1.634 | 23.8 | -6.42 |
| 7 | | 2.163 | ASP | 0.105 | — | — | — | — |
| 8 | Lens 4 | 4.906 | ASP | 2.172 | Plastic | 1.544 | 55.9 | 1.83 |
| 9 | | -1.055 | ASP | 0.100 | — | — | — | — |
| 10 | Lens 5 | 2.454 | ASP | 0.420 | Plastic | 1.634 | 23.8 | -2.24 |
| 11 | | 0.841 | ASP | 1.500 | — | — | — | — |
| 12 | IR-cut filter | — | Plano | 0.300 | Glass | 1.516 | 64.1 | — |
| 13 | | — | Plano | 0.496 | — | — | — | — |
| 14 | Image Plane | — | Plano | — | — | — | — | — |

Note:
Reference wavelength is d-line 587.6 nm, and ASP represents aspheric.

As for the parameters of the aspheric surfaces, reference is made to Table 4-2 below.

TABLE 4-2

Aspheric Coefficients

| | Surface# | | | | | | |
|---|---|---|---|---|---|---|---|
| | 3 | 4 | 6 | 7 | 8 | 9 | 10 | 11 |
| k = | 9.5128E-02 | -9.9000E+01 | 1.3733E+01 | -9.6414E+00 | 4.8410E+00 | -3.4414E+00 | -3.7701E+01 | -4.9274E+00 |
| A4 = | 1.9118E-03 | 2.2792E-03 | -1.3623E-01 | 4.9441E-03 | -4.7061E-02 | -2.7064E-02 | -2.5054E-02 | -2.9886E-02 |
| A6 = | 1.0248E-03 | -5.6212E-03 | 4.2346E-02 | -3.9490E-02 | -6.5979E-03 | -8.9033E-03 | -3.7282E-03 | 8.3937E-03 |
| A8 = | -1.2126E-03 | 5.1705E-03 | -8.8438E-02 | 2.5447E-02 | 3.3971E-03 | 5.4364E-03 | 3.6366E-03 | -1.6299E-03 |
| A10 = | 9.9901E-04 | -8.0206E-04 | 8.0114E-02 | -7.7516E-03 | -6.3868E-04 | -6.6634E-04 | -8.5955E-04 | 1.9348E-04 |
| A12 = | — | — | -3.7728E-02 | 6.6586E-04 | 2.6705E-05 | -2.6094E-04 | 7.8392E-05 | -9.6153E-06 |
| A14 = | — | — | 4.1030E-03 | — | — | 8.0831E-05 | — | — |

The content of Table 4-3 may be deduced from Table 4-1.

TABLE 4-3

Embodiment 4

| f (mm) | 2.57 | $(R_7 + R_8)/(R_7 - R_8)$ | 0.65 |
|---|---|---|---|
| Fno | 2.80 | $(R_9 + R_{10})/(R_9 - R_{10})$ | 2.04 |
| HFOV(deg.) | 52.1 | $f/f_{12}$ | 0.49 |
| $(V_4 + V_3)/(V_4 - V_3)$ | 2.49 | $f_{12}/f_{345}$ | 0.76 |
| $R_2/T_{12}$ | 0.62 | FOV(deg.) | 104.1 |
| $R_3/|R_4|$ | 0.06 | f/tan(HFOV)(mm) | 2.01 |
| $R_6/|R_5|$ | 0.44 | $Dr_5r_{10}/TD$ | 0.30 |
| $|R_6/R_7|$ | 0.44 | — | — |

The Fifth Embodiment (Embodiment 5)

Referring to FIGS. 5A to 5D, the image lens system 5 of the fifth embodiment comprises, from an object side to an image side along an optical axis in sequence, a first lens element 510, a second lens element 520, an aperture stop 500, a third lens element 530, a fourth lens element 540, a fifth lens element 550, an IR-cut filter 560 and an image plane 570 including an image sensor.

The first lens element 510 with negative refractive power has an aspheric convex object-side surface 511 and an aspheric concave image-side surface 512. The second lens element 520 with positive refractive power has an aspheric convex object-side surface 521 and an aspheric concave image-side surface 522. The third lens element 530 with negative refractive power has an aspheric convex object-side surface 531 and an aspheric concave image-side surface 532. The fourth lens element 540 with positive refractive power has an aspheric convex object-side surface 541 and an aspheric convex image-side surface 542. The fifth lens element 550 with negative refractive power has an aspheric convex object-side surface 551 and an aspheric concave image-side surface 552. The fifth lens element 550 has at least one inflection point on at least one of the object-side surface 551 and the image-side surface 552.

The detailed data of the image lens system 5 is as shown in Table 5-1 below.

TABLE 5-1

Embodiment 5
f = 2.54 mm, Fno = 2.80, HFOV = 51.9 deg.

| Surface# | | Curvature Radius (mm) | | Thickness (mm) | Material | Index | Abbe # | Focal length (mm) |
|---|---|---|---|---|---|---|---|---|
| 0 | Object | — | Plano | Infinity | — | — | — | — |
| 1 | Lens 1 | 64.814 | ASP | 0.800 | Glass | 1.592 | 60.6 | −4.75 |
| 2 | | 2.681 | ASP | 4.128 | — | — | — | — |
| 3 | Lens 2 | 2.421 | ASP | 0.901 | Glass | 1.566 | 61.1 | 4.41 |
| 4 | | 70.837 | ASP | 0.751 | — | — | — | — |
| 5 | Ape. Stop | — | Plano | 0.697 | — | — | — | — |
| 6 | Lens 3 | 7.143 | ASP | 0.432 | Plastic | 1.634 | 23.8 | −4.80 |
| 7 | | 2.085 | ASP | 0.089 | — | — | — | — |
| 8 | Lens 4 | 3.894 | ASP | 1.830 | Plastic | 1.535 | 56.3 | 2.25 |
| 9 | | −1.452 | ASP | 0.151 | — | — | — | — |
| 10 | Lens 5 | 1.877 | ASP | 0.400 | Plastic | 1.634 | 23.8 | −4.48 |
| 11 | | 1.037 | ASP | 1.500 | — | — | — | — |
| 12 | IR-cut filter | — | Plano | 0.300 | Glass | 1.516 | 64.1 | — |
| 13 | | — | Plano | 0.578 | — | — | — | — |
| 14 | Image Plane | — | Plano | — | — | — | — | — |

Note:
Reference wavelength is d-line 587.6 nm, and ASP represents aspheric.

As for the parameters of the aspheric surfaces, reference is made to Table 5-2 below.

TABLE 5-2

Aspheric Coefficients

| | Surface# | | | | |
|---|---|---|---|---|---|
| | 1 | 2 | 3 | 4 | 6 |
| k = | 5.4238E+01 | −3.3758E−01 | −1.9080E−01 | −9.9000E+01 | −9.7469E+00 |
| A4 = | 1.1891E−04 | −6.4271E−04 | 2.2125E−04 | 1.4442E−03 | 5.9926E−03 |
| A6 = | 2.6877E−07 | 1.0372E−05 | −1.1330E−04 | −3.3667E−03 | −3.7540E−02 |
| A8 = | — | −6.4621E−06 | −4.6599E−04 | 1.4606E−03 | 2.4731E−02 |
| A10 = | — | — | 1.2592E−04 | −1.9164E−04 | −7.7983E−03 |
| A12 = | — | — | — | — | 7.6061E−04 |

| | Surface# | | | | |
|---|---|---|---|---|---|
| | 7 | 8 | 9 | 10 | 11 |
| k = | 3.1316E+00 | 3.1316E+00 | −2.5034E+00 | −9.2414E+00 | −3.8866E+00 |
| A4 = | −1.2533E−02 | −1.2533E−02 | −2.7483E−03 | −3.1455E−02 | −3.7556E−02 |
| A6 = | −7.4096E−03 | −7.4096E−03 | −1.5171E−02 | 2.6009E−02 | 1.0683E−02 |
| A8 = | 3.3102E−03 | 3.3102E−03 | 5.9796E−03 | 3.1315E−03 | −1.4798E−03 |
| A10 = | −6.6692E−04 | −6.6692E−04 | −3.5936E−04 | −8.6636E−04 | 1.0461E−04 |
| A12 = | 1.7177E−05 | 1.7177E−05 | −2.5857E−04 | 7.5887E−05 | −2.0892E−06 |
| A14 = | — | — | 6.2986E−05 | — | — |

The content of Table 5-3 may be deduced from Table 5-1.

TABLE 5-3

Embodiment 5

| f (mm) | 2.54 | $(R_7 + R_8)/(R_7 - R_8)$ | 0.46 |
|---|---|---|---|
| Fno | 2.80 | $(R_9 + R_{10})/(R_9 - R_{10})$ | 3.47 |
| HFOV(deg.) | 51.9 | $f/f_{12}$ | 0.54 |
| $(V_4 + V_3)/(V_4 - V_3)$ | 2.47 | $f_{12}/f_{345}$ | 0.69 |
| $R_2/T_{12}$ | 0.65 | FOV(deg.) | 103.9 |
| $R_3/|R_4|$ | 0.03 | f/tan(HFOV)(mm) | 1.99 |
| $R_6/|R_5|$ | 0.29 | $Dr_5r_{10}/TD$ | 0.29 |
| $|R_6/R_7|$ | 0.54 | — | |

The Sixth Embodiment (Embodiment 6)

Referring to FIGS. 6A to 6D, the image lens system 6 of the sixth embodiment comprises, from an object side to an image side along an optical axis in sequence, a first lens element 610, a second lens element 620, an aperture stop 600, a third lens element 630, a fourth lens element 640, a fifth lens element 650, an IR-cut filter 660 and an image plane 670 including an image sensor.

The first lens element 610 with negative refractive power has a convex object-side surface 611 and a concave image-side surface 612. The second lens element 620 with positive refractive power has a convex object-side surface 621 and a convex image-side surface 622. The third lens element 630 with negative refractive power has an aspheric convex object-side surface 631 and an aspheric concave image-side surface 632. The fourth lens element 640 with positive refractive power has an aspheric convex object-side surface 641 and an aspheric convex image-side surface 642. The fifth lens element 650 with negative refractive power has an aspheric convex object-side surface 651 and an aspheric concave image-side surface 652. The fifth lens element 650 has at least one inflection point on at least one of the object-side surface 651 and the image-side surface 652.

The detailed data of the image lens system 6 is as shown in Table 6-1 below.

TABLE 6-1

Embodiment 6
f = 2.68 mm, Fno = 2.80, HFOV = 65.2 deg.

| Surface# | | Curvature Radius (mm) | Thickness (mm) | Material | Index | Abbe # | Focal length (mm) |
|---|---|---|---|---|---|---|---|
| 0 | Object | — | Plano Infinity | — | — | — | — |
| 1 | Lens 1 | 199.564 | 0.800 | Glass | 1.729 | 54.5 | −3.48 |
| 2 | | 2.498 | 2.490 | — | — | — | — |
| 3 | Lens 2 | 5.455 | 3.314 | Glass | 1.804 | 46.5 | 3.92 |
| 4 | | −5.455 | 0.061 | — | — | — | — |
| 5 | Ape. Stop | Plano | 0.564 | — | — | — | — |
| 6 | Lens 3 | 5.975 ASP | 0.350 | Plastic | 1.640 | 23.3 | −3.91 |
| 7 | | 1.724 ASP | 0.096 | — | — | — | — |
| 8 | Lens 4 | 2.981 ASP | 1.513 | Plastic | 1.535 | 56.3 | 2.76 |
| 9 | | −2.413 ASP | 1.112 | — | — | — | — |
| 10 | Lens 6 | 2.785 ASP | 0.400 | Plastic | 1.640 | 23.3 | −10.27 |
| 11 | | 1.846 ASP | 1.500 | — | — | — | — |
| 12 | IR-cut filter | — Plano | 0.300 | Glass | 1.516 | 64.1 | — |
| 13 | | — Plano | 0.501 | — | — | — | — |
| 14 | Image Plane | — Plano | — | — | — | — | — |

Note:
Reference wavelength is d-line 587.6 nm, and ASP represents aspheric.

As for the parameters of the aspheric surfaces, reference is made to Table 6-2 below.

TABLE 6-2

Aspheric Coefficients

| | Surface# | | |
|---|---|---|---|
| | 6 | 7 | 8 |
| k = | 4.7430E+00 | −3.8320E+00 | 1.7848E+00 |
| A4 = | −1.4113E−01 | −1.0287E−01 | −5.3489E−02 |
| A6 = | 6.1791E−02 | 6.0235E−02 | −5.9874E−04 |
| A8 = | −4.2068E−02 | −2.6115E−02 | 6.5279E−03 |
| A10 = | 3.2032E−02 | 6.9199E−03 | −1.5507E−03 |
| A12 = | −2.2255E−02 | −1.3203E−03 | 1.5094E−23 |
| A14 = | 4.6356E−03 | — | — |

| | Surface# | | |
|---|---|---|---|
| | 9 | 10 | 11 |
| k = | −6.6885E−01 | −1.3762E+01 | −6.1581E+00 |
| A4 = | −2.7318E−02 | −9.0846E−02 | −7.7777E−02 |
| A6 = | 1.4683E−02 | 5.9611E−03 | 1.8638E−02 |
| A8 = | −1.3535E−02 | 4.1260E−03 | −2.9214E−03 |
| A10 = | 9.0042E−03 | −1.5998E−03 | 2.4467E−04 |
| A12 = | −3.4429E−03 | 1.9995E−04 | −5.3591E−06 |
| A14 = | 6.2137E−04 | — | — |

The content of Table 6-3 may be deduced from Table 6-1.

TABLE 6-3

Embodiment 6

| f (mm) | 2.68 | $(R_7 + R_8)/R_7 - R_8)$ | 0.11 |
|---|---|---|---|
| Fno | 2.80 | $(R_9 + R_{10})/(R_9 - R_{10})$ | 4.93 |
| HFOV(deg.) | 65.2 | $f/f_{12}$ | 0.61 |

TABLE 6-3-continued

Embodiment 6

| $(V_4 + V_3)/(V_4 - V_3)$ | 2.41 | $f_{12}/f_{345}$ | 0.39 |
|---|---|---|---|
| $R_2/T_{12}$ | 1.00 | FOV(deg.) | 130.4 |
| $R_3/|R_4|$ | 1.00 | f/tan(HFOV)(mm) | 1.24 |
| $R_6/|R_5|$ | 0.29 | $Dr_5r_{10}/TD$ | 0.32 |
| $|R_6/R_7|$ | 0.58 | — | — |

The Seventh Embodiment (Embodiment 7)

Referring to FIGS. 7A to 7D, the image lens system 7 of the seventh embodiment comprises, from an object side to an image side along an optical axis in sequence, a first lens element 710, a second lens element 720, an aperture stop 700, a third lens element 730, a fourth lens element 740, a fifth lens element 750, an IR-cut filter 760 and an image plane 770 including an image sensor.

The first lens element 710 with negative refractive power has a convex object-side surface 711 and a concave image-side surface 712. The second lens element 720 with positive refractive power has a convex object-side surface 721 and a convex image-side surface 722. The third lens element 730 with negative refractive power has an aspheric convex object-side surface 731 and an aspheric concave image-side surface 732. The fourth lens element 740 with positive refractive power has an aspheric convex object-side surface 741 and an aspheric convex image-side surface 742. The fifth lens element 750 with negative refractive power has an aspheric convex object-side surface 751 and an aspheric concave image-side surface 752. The fifth lens element 750 has at least one inflection point on at least one of the object-side surface 751 and the image-side surface 752.

The detailed data of the image lens system 7 is as shown in Table 7-1 below.

TABLE 7-1

Embodiment 7
f = 2.55 mm, Fno = 2.80, HFOV = 64.9 deg.

| Surface# | | Curvature Radius (mm) | Thickness (mm) | Material | Index | Abbe # | Focal length (mm) |
|---|---|---|---|---|---|---|---|
| 0 | Object | — | Plano Infinity | — | — | — | — |
| 1 | Lens 1 | 153.601 | — 0.909 | Glass | 1.729 | 54.5 | −3.50 |
| 2 | | 2.503 | — 2.014 | — | — | — | — |
| 3 | Lens 2 | 5.520 | — 3.259 | Glass | 1.772 | 49.6 | 4.10 |
| 4 | | −5.520 | — 0.075 | — | — | — | — |
| 5 | Ape. Stop | — | Plano 0.740 | — | — | — | — |
| 6 | Lens 3 | 5.837 | ASP 0.350 | Plastic | 1.634 | 23.8 | −4.73 |
| 7 | | 1.934 | ASP 0.094 | — | — | — | — |
| 8 | Lens 4 | 3.433 | ASP 2.174 | Plastic | 1.535 | 56.3 | 2.25 |
| 9 | | −1.438 | ASP 0.224 | — | — | — | — |
| 10 | Lens 5 | 2.121 | ASP 0.400 | Plastic | 1.634 | 23.8 | −4.28 |
| 11 | | 1.103 | ASP 1.500 | — | — | — | — |
| 12 | IR-cut filter | — | Plano 0.300 | Glass | 1.516 | 64.1 | — |
| 13 | | — | Plano 0.858 | — | — | — | — |
| 14 | Image Plane | — | Plano — | — | — | — | — |

Note:
Reference wavelength is d-line 587.6 nm, and ASP represents aspheric.

As for the parameters of the aspheric surfaces, reference is made to Table 7-2 below.

TABLE 7-3

Aspheric Coefficients

| | Surface# | | |
|---|---|---|---|
| | 6 | 7 | 8 |
| k = | 2.0509E+01 | −8.4668E+00 | 1.8098E+00 |
| A4 = | −1.2365E−01 | 1.2084E−02 | −1.6384E−02 |
| A6 = | 6.4813E−02 | −3.9081E−02 | −7.3673E−03 |
| A8 = | −9.8680E−02 | 2.4403E−02 | 3.5499E−03 |
| A10 = | 8.2141E−02 | −7.7927E−03 | −5.2956E−04 |
| A12 = | −3.4425E−02 | 8.1691E−04 | −2.8953E−21 |
| A14 = | 3.1892E−03 | — | — |

| | Surface# | | |
|---|---|---|---|
| | 9 | 10 | 11 |
| k = | −2.2666E+00 | −1.2151E+01 | −4.1697E+00 |
| A4 = | −5.1669E−04 | −3.4387E−02 | −3.8451E−02 |
| A6 = | −1.5389E−02 | 6.8952E−05 | 9.9058E−03 |
| A8 = | 5.7379E−03 | 2.9542E−03 | −1.3905E−03 |
| A10 = | −4.2488E−04 | −8.5209E−04 | 7.5962E−05 |
| A12 = | −2.6535E−04 | 7.9594E−05 | 1.1845E−06 |
| A14 = | 6.7704E−05 | — | — |

The content of Table 7-3 may be deduced from Table 7-1.

TABLE 7-3

Embodiment 7

| f (mm) | 2.55 | $(R_7 + R_8)/(R_7 - R_8)$ | 0.41 |
|---|---|---|---|
| Fno | 2.80 | $(R_9 + R_{10})/(R_9 - R_{10})$ | 3.17 |
| HFOV(deg.) | 64.9 | $f/f_{12}$ | 0.44 |

TABLE 7-3-continued

Embodiment 7

| $(V_4 + V_3)/(V_4 - V_3)$ | 2.47 | $f_{12}/f_{345}$ | 0.92 |
|---|---|---|---|
| $R_2/T_{12}$ | 1.24 | FOV(deg.) | 129.8 |
| $R_3/|R_4|$ | 1.00 | f/tan(HFOV)(mm) | 1.20 |
| $R_6/|R_5|$ | 0.33 | $Dr_5r_{10}/TD$ | 0.32 |
| $|R_6/R_7|$ | 0.56 | — | — |

The Eighth Embodiment (Embodiment 8)

Referring to FIGS. 8A to 8D, the image lens system 8 of the eighth embodiment comprises, from an object side to an image side along an optical axis in sequence, a first lens element 810, a second lens element 820, an aperture stop 800, a third lens element 830, a fourth lens element 840, a fifth lens element 850, an IR-cut filter 860 and an image plane 870 including an image sensor.

The first lens element 810 with negative refractive power has a convex object-side surface 811 and a concave image-side surface 812. The second lens element 820 with positive refractive power has an aspheric convex object-side surface 821 and an aspheric concave image-side surface 822. The third lens element 830 with negative refractive power has an aspheric convex object-side surface 831 and an aspheric concave image-side surface 832. The fourth lens element 840 with positive refractive power has an aspheric convex object-side surface 841 and an aspheric convex image-side surface 842. The fifth lens element 850 with negative refractive power has an aspheric convex object-side surface 851 and an aspheric concave image-side surface 852. The fifth lens element 850 has at least one inflection point on at least one of the object-side surface 851 and the image-side surface 852.

The detailed data of the image lens system 8 is as shown in Table 8-1 below.

TABLE 8-1

Embodiment 8
f = 2.73 mm, Fno = 2.80, HFOV = 52.7 deg.

| Surface# | | Curvature Radius (mm) | Thickness (mm) | Material | Index | Abbe # | Focal length (mm) |
|---|---|---|---|---|---|---|---|
| 0 | Object | — | Plano Infinity | — | — | — | — |
| 1 | Lens 1 | 21.742 | — 1.294 | Plastic | 1.729 | 54.5 | −5.42 |
| 2 | | 3.262 | — 4.162 | — | — | — | — |
| 3 | Lens 2 | 2.406 | ASP 0.771 | Glass | 1.566 | 61.1 | 4.34 |

TABLE 8-1-continued

Embodiment 8
f = 2.73 mm, Fno = 2.80, HFOV = 52.7 deg.

| Surface# | | Curvature Radius (mm) | | Thickness (mm) | Material | Index | Abbe # | Focal length (mm) |
|---|---|---|---|---|---|---|---|---|
| 4 | | 109.769 | ASP | 0.643 | — | — | — | — |
| 5 | Ape. Stop | — | Plano | 0.784 | — | — | — | — |
| 6 | Lens 3 | 7.314 | ASP | 0.480 | Plastic | 1.634 | 23.8 | −5.42 |
| 7 | | 2.278 | ASP | 0.125 | — | — | — | — |
| 8 | Lens 4 | 6.879 | ASP | 1.999 | Glass | 1.566 | 61.1 | 2.33 |
| 9 | | −1.462 | ASP | 0.163 | — | — | — | — |
| 10 | Lens 5 | 1.692 | ASP | 0.400 | Plastic | 1.634 | 23.8 | −4.27 |
| 11 | | 0.946 | ASP | 1.200 | — | — | — | — |
| 12 | IR-cut filter | — | Plano | 0.300 | Glass | 1.516 | 64.1 | — |
| 13 | | — | Plano | 0.801 | — | — | — | — |
| 14 | Image Plane | — | Plano | — | — | — | — | — |

Note:
Reference wavelength is d-line 587.6 nm, and ASP represents aspheric.

As for the parameters of the aspheric surfaces, reference is made to Table 8-2 below.

TABLE 8-2

Aspheric Coefficients

| | Surface# | | | | | | |
|---|---|---|---|---|---|---|---|
| 3 | 4 | 6 | 7 | 8 | 9 | 10 | 11 |
| k = −1.2138E−01 | 2.0000E+01 | 3.8757E+01 | −1.1389E+01 | 7.5514E+00 | −2.3310E+00 | −7.2829E+00 | −3.3627E+00 |
| A4 = 1.1290E−03 | 4.1053E−04 | −1.3606E−01 | 1.6024E−03 | −3.0930E−03 | −2.2457E−04 | −3.6228E−02 | −4.5316E−02 |
| A6 = −3.1348E−04 | −4.5757E−03 | 3.9902E−02 | −3.7777E−02 | −6.7973E−03 | −1.6698E−02 | −1.6918E−04 | 1.1460E−02 |
| A8 = −6.8450E−04 | 2.1974E−03 | −9.0809E−02 | 2.4868E−02 | 3.3066E−03 | 5.7069E−03 | 3.2535E−03 | −1.5811E−03 |
| A10 = 2.1610E−04 | −3.0255E−04 | 8.1650E−02 | −7.6539E−03 | −6.8299E−04 | −3.2974E−04 | −8.6146E−04 | 8.4465E−05 |
| A12 = — | — | −3.5602E−02 | 8.2834E−04 | 5.1206E−05 | −2.5980E−04 | 7.2898E−05 | 1.3055E−06 |
| A14 = — | — | 4.3092E−04 | — | — | 5.0657E−05 | — | — |

The content of Table 8-3 may be deduced from Table 8-1.

TABLE 8-3

Embodiment 8

| f (mm) | 2.73 | $(R_7 + R_8)/(R_7 - R_8)$ | 0.65 |
|---|---|---|---|
| Fno | 2.80 | $(R_9 + R_{10})/(R_9 - R_{10})$ | 3.54 |
| HFOV(deg.) | 52.7 | $f/f_{12}$ | 0.59 |
| $(V_4 + V_3)/(V_4 - V_3)$ | 2.28 | $f_{12}/f_{345}$ | 0.64 |
| $R_2/T_{12}$ | 0.78 | FOV(deg.) | 105.3 |
| $R_3/|R_4|$ | 0.02 | f/tan(HFOV)(mm) | 2.08 |
| $R_6/|R_5|$ | 0.31 | $Dr_5r_{10}/TD$ | 0.29 |
| $|R_6/R_7|$ | 0.33 | — | — |

The Ninth Embodiment (Embodiment 9)

Referring to FIGS. 9A to 9D, the image lens system 9 of the ninth embodiment comprises, from an object side to an image side along an optical axis in sequence, a first lens element 910, a second lens element 920, an aperture stop 900, a third lens element 930, a fourth lens element 940, a fifth lens element 950, an IR-cut filter 960 and an image plane 970 including an image sensor.

The first lens element 910 with negative refractive power has an aspheric concave object-side surface 911 and an aspheric concave image-side surface 912. The second lens element 920 with positive refractive power has an aspheric convex object-side surface 921 and an aspheric concave image-side surface 922. The third lens element 930 with negative refractive power has an aspheric convex object-side surface 931 and an aspheric concave image-side surface 932. The fourth lens element 940 with positive refractive power has an aspheric convex object-side surface 941 and an aspheric convex image-side surface 942. The fifth lens element 950 with negative refractive power has an aspheric convex object-side surface 951 and an aspheric concave image-side surface 952. The fifth lens element 950 has at least one inflection point on at least one of the object-side surface 951 and the image-side surface 952.

The detailed data of the image lens system 9 is as shown in Table 9-1 below.

TABLE 9-1

Embodiment 9
f = 2.79 mm, Fno = 2.80, HFOV = 49.7 deg.

| Surface # | | Curvature Radius (mm) | | Thickness (mm) | Material | Index | Abbe # | Focal length (mm) |
|---|---|---|---|---|---|---|---|---|
| 0 | Object | — | Plano | Infinity | — | — | — | — |
| 1 | Lens 1 | −74.768 | ASP | 0.800 | Plastic | 1.544 | 55.9 | −5.19 |

TABLE 9-1-continued

Embodiment 9
f = 2.79 mm, Fno = 2.80, HFOV = 49.7 deg.

| Surface # | | Curvature Radius (mm) | | Thickness (mm) | Material | Index | Abbe # | Focal length (mm) |
|---|---|---|---|---|---|---|---|---|
| 2 | | 2.945 | ASP | 4.144 | — | — | — | — |
| 3 | Lens 2 | 2.068 | ASP | 1.000 | Glass | 1.566 | 61.1 | 4.06 |
| 4 | | 17.018 | ASP | 0.833 | — | — | — | — |
| 5 | Ape. Stop | — | Plano | 0.625 | — | — | — | — |
| 6 | Lens 3 | 11.358 | ASP | 0.451 | Plastic | 1.634 | 23.8 | −4.82 |
| 7 | | 2.372 | ASP | 0.102 | — | — | — | — |
| 8 | Lens 4 | 5.881 | ASP | 1.802 | Glass | 1.566 | 61.1 | 2.50 |
| 9 | | −1.655 | ASP | 0.100 | — | — | — | — |
| 10 | Lens 5 | 1.965 | ASP | 0.403 | Plastic | 1.634 | 23.8 | −5.65 |
| 11 | | 1.168 | ASP | 1.200 | — | — | — | — |
| 12 | IR-cut filter | — | Plano | 0.300 | Glass | 1.516 | 64.1 | — |
| 13 | | — | Plano | 0.802 | — | — | — | — |
| 14 | Image Plane | — | Plano | — | — | — | — | — |

Note:
Reference wavelength is d-line 587.6 nm, and ASP represents aspheric.

As for the parameters of the aspheric surfaces, reference is made to Table 9-2 below.

TABLE 9-2

Aspheric Coefficients

| | Surface# | | | | |
|---|---|---|---|---|---|
| | 1 | 2 | 3 | 4 | 6 |
| k = | −6.0926E+01 | −4.1210E−01 | −2.3156E−01 | 1.3042E+01 | 5.3471E+01 |
| A4 = | −1.1758E−04 | −3.0105E−03 | −1.3881E−03 | 1.6608E−03 | −1.3779E−01 |
| A6 = | −3.2068E−06 | −9.3520E−05 | −3.8174E−04 | −3.7964E−03 | 5.7480E−02 |
| A8 = | — | −1.4888E−05 | −3.9258E−04 | 1.0437E−03 | −9.4097E−02 |
| A10 = | — | — | −1.2104E−06 | −9.9914E−05 | 8.3990E−02 |
| A12 = | — | — | — | — | −2.9337E−02 |
| A14 = | — | — | — | — | −3.0221E−03 |

| | Surface# | | | | |
|---|---|---|---|---|---|
| | 7 | 8 | 9 | 10 | 11 |
| k = | −1.3778E+01 | 9.9342E+00 | −2.4617E+00 | −8.4320E+00 | −4.1695E+00 |
| A4 = | 2.4339E−03 | 2.0180E−03 | 6.1933E−03 | −3.5917E−02 | −4.6440E−02 |
| A6 = | −3.3350E−02 | −8.0992E−03 | −1.5833E−02 | −4.4755E−04 | 1.0937E−02 |
| A8 = | 2.5463E−02 | 2.8737E−03 | 5.6984E−03 | 3.2330E−03 | −1.5504E−03 |
| A10 = | −7.9917E−03 | −8.0728E−04 | −3.4877E−04 | −8.7161E−04 | 1.0155E−04 |
| A12 = | 7.0952E−04 | 1.3842E−05 | −2.6727E−04 | 7.6837E−05 | −2.2314E−07 |
| A14 = | — | — | 4.8103E−05 | — | — |

The content of Table 9-3 may be deduced from Table 9-1.

TABLE 9-3

Embodiment 9

| f (mm) | 2.79 | $(R_7 + R_8)/(R_7 - R_8)$ | 0.56 |
|---|---|---|---|
| Fno | 2.80 | $(R_9 + R_{10})/(R_9 - R_{10})$ | 3.93 |
| HFOV(deg.) | 49.7 | $f/f_{12}$ | 0.69 |
| $(V_4 + V_3)/(V_4 - V_3)$ | 2.28 | $f_{12}/f_{345}$ | 0.48 |
| $R_2/T_{12}$ | 0.71 | FOV(deg.) | 99.4 |
| $R_3/|R_4|$ | 0.12 | f/tan(HFOV)(mm) | 2.37 |
| $R_6/|R_5|$ | 0.21 | $Dr_5r_{10}/TD$ | 0.28 |
| $|R_6/R_7|$ | 0.40 | — | — |

The Tenth Embodiment (Embodiment 10)

Referring to FIGS. 10A to 10D, the image lens system 10 of the tenth embodiment comprises, from an object side to an image side along an optical axis in sequence, a first lens element 1010, a second lens element 1020, an aperture stop 1000, a third lens element 1030, a fourth lens element 1040, a fifth lens element 1050, an IR-cut filter 1060 and an image plane 1070 including an image sensor.

The first lens element 1010 with negative refractive power has an aspheric convex object-side surface 1011 and an aspheric concave image-side surface 1012. The second lens element 1020 with positive refractive power has an aspheric convex object-side surface 1021 and an aspheric concave image-side surface 1022. The third lens element 1030 with negative refractive power has an aspheric convex object-side surface 1031 and an aspheric concave image-side surface 1032. The fourth lens element 1040 with positive refractive power has an aspheric convex object-side surface 1041 and an aspheric convex image-side surface 1042. The fifth lens element 1050 with negative refractive power has an aspheric convex object-side surface 1051 and an aspheric concave image-side surface 1052. The fifth lens element 1050 has at least one inflection point on at least one of the object-side surface 1051 and the image-side surface 1052.

The detailed data of the image lens system 10 is as shown in Table 10-1 below.

TABLE 10-1

Embodiment 10
f = 2.76 mm, Fno = 2.80, HFOV = 49.6 deg.

| Surface# | | Curvature Radius (mm) | | Thickness (mm) | Material | Index | Abbe # | Focal length (mm) |
|---|---|---|---|---|---|---|---|---|
| 0 | Object | — | Plano | Infinity | — | — | — | — |
| 1 | Lens 1 | 152.905 | ASP | 0.800 | Plastic | 1.544 | 55.9 | −5.30 |
| 2 | | 2.824 | ASP | 4.266 | — | — | — | — |
| 3 | Lens 2 | 1.999 | ASP | 0.893 | Glass | 1.566 | 61.1 | 4.01 |
| 4 | | 14.068 | ASP | 0.729 | — | — | — | — |
| 5 | Ape. Stop | — | Plano | 0.660 | — | — | — | — |
| 6 | Lens 3 | 14.473 | ASP | 0.463 | Plastic | 1.634 | 23.8 | −4.73 |
| 7 | | 2.455 | ASP | 0.093 | — | — | — | — |
| 8 | Lens 4 | 5.904 | ASP | 1.758 | Glass | 1.566 | 61.1 | 2.51 |
| 9 | | −1.665 | ASP | 0.100 | — | — | — | — |
| 10 | Lens 5 | 1.909 | ASP | 0.400 | Plastic | 1.634 | 23.8 | −5.63 |
| 11 | | 1.143 | ASP | 1.200 | — | — | — | — |
| 12 | IR-cut filter | — | Plano | 0.300 | Glass | 1.516 | 64.1 | — |
| 13 | | — | Plano | 0.799 | — | — | — | — |
| 14 | Image Plane | — | Plano | — | — | — | — | — |

Note:
Reference wavelength is d-line 587.6 nm, and ASP represents aspheric.

As for the parameters of the aspheric surfaces, reference is made to Table 10-2 below.

TABLE 10-2

Aspheric Coefficients

| Surface# | 1 | 2 | 3 | 4 | 6 |
|---|---|---|---|---|---|
| k = | 2.0000E+01 | −4.3015E−01 | −2.1003E−01 | 1.1264E+01 | 3.0000E+00 |
| A4 = | −1.1767E−04 | −1.8196E−03 | −3.3061E−04 | 1.7346E−03 | −1.3538E−01 |
| A6 = | 1.2833E−06 | −5.2179E−05 | −3.9546E−04 | −3.9254E−03 | 5.7428E−02 |
| A8 = | — | −1.2811E−05 | −3.0942E−04 | 1.0395E−03 | −9.6806E−02 |
| A10 = | — | — | −4.4022E−05 | −9.8155E−05 | 8.3972E−02 |
| A12 = | — | — | — | — | −2.8605E−02 |
| A14 = | — | — | — | — | −4.1125E−03 |

| Surface# | 7 | 8 | 9 | 10 | 11 |
|---|---|---|---|---|---|
| k = | −1.4786E+01 | 1.0201E+01 | −2.4960E+00 | −8.0675E+00 | −4.0474E+00 |
| A4 = | 2.7012E−03 | 1.9689E−03 | 5.5701E−03 | −3.3842E−02 | −4.4111E−02 |
| A6 = | −3.2943E−02 | −8.4398E−03 | −1.5904E−02 | −4.5293E−04 | 1.0767E−02 |
| A8 = | 2.5130E−02 | 2.8277E−03 | 5.6699E−03 | 3.1839E−03 | −1.5507E−03 |
| A10 = | −8.1186E−03 | −8.1477E−04 | −3.6829E−04 | −8.8013E−04 | 1.0275E−04 |
| A12 = | 8.4702E−04 | 2.0382E−05 | −2.7279E−04 | 7.7073E−05 | −4.1810E−07 |
| A14 = | — | — | 4.7951E−05 | — | — |

The content of Table 10-3 may be deduced from Table 10-1.

TABLE 10-3

Embodiment 10

| f (mm) | 2.76 | $(R_7 + R_8)/(R_7 - R_8)$ | 0.56 |
|---|---|---|---|
| Fno | 2.80 | $(R_9 + R_{10})/(R_9 - R_{10})$ | 3.98 |
| HFOV(deg.) | 49.6 | $f/f_{12}$ | 0.71 |
| $(V_4 + V_3)/(V_4 - V_3)$ | 2.28 | $f_{12}/f_{345}$ | 0.43 |
| $R_2/T_{12}$ | 0.66 | FOV(deg.) | 99.1 |
| $R_3/|R_4|$ | 0.14 | f/tan(HFOV)(mm) | 2.35 |
| $R_6/|R_5|$ | 0.17 | $Dr_5r_{10}/TD$ | 0.28 |
| $|R_6/R_7|$ | 0.42 | — | — |

The Eleventh Embodiment (Embodiment 11)

Referring to FIGS. 11A to 11D, the image lens system 11 of the eleventh embodiment comprises, from an object side to an image side along an optical axis in sequence, a first lens element 1110, a second lens element 1120, an aperture stop 1100, a third lens element 1130, a fourth lens element 1140, a fifth lens element 1150, an IR-cut filter 1160 and an image plane 1170 including an image sensor.

The first lens element 1110 with negative refractive power has an aspheric convex object-side surface 1111 and an aspheric concave image-side surface 1112. The second lens element 1120 with positive refractive power has an aspheric convex object-side surface 1121 and an aspheric convex image-side surface 1122. The third lens element 1130 with negative refractive power has an aspheric concave object-side surface 1131 and an aspheric concave image-side surface 1132. The fourth lens element 1140 with positive refractive power has an aspheric convex object-side surface 1141 and an aspheric convex image-side surface 1142. The fifth lens element 1150 with negative refractive power has an aspheric convex object-side surface 1151 and an aspheric concave image-side surface 1152. The fifth lens element 1150 has at least one inflection point on at least one of the object-side surface 1151 and the image-side surface 1152.

The detailed data of the image lens system 11 is as shown in Table 11-1 below.

TABLE 11-1

Embodiment 11
f = 2.74 mm, Fno = 2.70, HFOV = 49.3 deg.

| Surface# | | Curvature Radius (mm) | Thickness (mm) | Material | Index | Abbe # | Focal length (mm) |
|---|---|---|---|---|---|---|---|
| 0 | Object | — | Plano | Infinity | — | — | — |
| 1 | Lens 1 | 158.228 | ASP | 0.800 | Plastic | 1.544 | 55.9 | -4.79 |
| 2 | | 2.559 | ASP | 3.875 | — | — | — | — |
| 3 | Lens 2 | 2.156 | ASP | 0.932 | Glass | 1.566 | 61.1 | 3.72 |
| 4 | | -75.131 | ASP | 0.666 | — | — | — | — |
| 5 | Ape. Stop | — | Plano | 0.762 | — | — | — | — |
| 6 | Lens 3 | -88.042 | ASP | 0.456 | Plastic | 1.634 | 23.8 | -4.17 |
| 7 | | 2.731 | ASP | 0.088 | — | — | — | — |
| 8 | Lens 4 | 6.055 | ASP | 1.701 | Glass | 1.566 | 61.1 | 2.53 |
| 9 | | -1.681 | ASP | 0.143 | — | — | — | — |
| 10 | Lens 5 | 1.924 | ASP | 0.400 | Plastic | 1.634 | 23.8 | -6.31 |
| 11 | | 1.195 | ASP | 1.200 | — | — | — | — |
| 12 | IR-cut filter | — | Plano | 0.300 | Glass | 1.516 | 64.1 | — |
| 13 | | — | Plano | 0.801 | — | — | — | — |
| 14 | Image Plane | — | Plano | — | — | — | — | — |

Note:
Reference wavelength is d-line 587.6 nm, and ASP represents aspheric.

As for the parameters of the aspheric surfaces, reference is made to Table 11-2 below.

TABLE 11-2

Aspheric Coefficients

| | Surface# | | | | |
|---|---|---|---|---|---|
| | 1 | 2 | 3 | 4 | 6 |
| k = | 2.0000E+01 | -4.4314E-01 | -1.9539E-01 | -9.9000E+01 | -2.5021E+01 |
| A4 = | -1.6399E-04 | -8.4978E-04 | 1.0556E-05 | 3.7847E-03 | -1.2507E-01 |
| A6 = | 2.8983E-06 | -1.4491E-05 | -1.7607E-04 | -3.1285E-03 | 6.0296E-02 |
| A8 = | — | -2.4403E-05 | -3.3996E-04 | 1.0537E-03 | -9.3766E-02 |
| A10 = | — | — | 2.4571E-05 | -1.3357E-04 | 8.3089E-02 |
| A12 = | — | — | — | — | -3.2483E-02 |
| A14 = | — | — | — | — | -2.4127E-05 |

| | Surface# | | | | |
|---|---|---|---|---|---|
| | 7 | 8 | 9 | 10 | 11 |
| k = | -1.9144E+01 | 1.0577E+01 | -2.2918E+00 | -7.2102E+00 | -3.9758E+00 |
| A4 = | 9.9685E-03 | 4.4361E-03 | 6.8230E-03 | -3.1197E-02 | -4.3385E-02 |
| A6 = | -3.1849E-02 | -8.8201E-03 | -1.5492E-02 | -4.1199E-04 | 1.0823E-02 |
| A8 = | 2.4139E-02 | 2.7761E-03 | 5.6772E-03 | 3.0557E-03 | -1.5272E-03 |
| A10 = | -8.3672E-03 | -8.4740E-04 | -3.9412E-04 | -8.8151E-04 | 9.0118E-05 |
| A12 = | 1.0308E-03 | 5.4108E-05 | -2.7870E-04 | 7.9434E-05 | 1.5168E-06 |
| A14 = | — | — | 5.0865E-05 | — | — |

The content of Table 11-3 may be deduced from Table 11-1.

TABLE 11-3

Embodiment 11

| | | | |
|---|---|---|---|
| f (mm) | 2.74 | $(R_7 + R_8)/R_7 - R_8)$ | 0.57 |
| Fno | 2.70 | $(R_9 + R_{10})/(R_9 - R_{10})$ | 4.27 |
| HFOV(deg.) | 49.3 | $f/f_{12}$ | 0.76 |
| $(V_4 + V_3)/(V_4 - V_3)$ | 2.28 | $f_{12}/f_{345}$ | 0.38 |
| $R_2/T_{12}$ | 0.66 | FOV(deg.) | 98.6 |
| $R_3/|R_4|$ | 0.03 | f/tan(HFOV)(mm) | 2.35 |
| $R_6/|R_5|$ | 0.03 | $Dr_5r_{10}/TD$ | 0.28 |
| $|R_6/R_7|$ | 0.45 | — | — |

It is to be noted that TABLES 1-11 show different data of the different embodiments, however, the data of the different embodiments are obtained from experiments. Therefore, any capturing lens system of the same structure is considered to be within the scope of the present disclosure even if it uses different data. The embodiments depicted above and the appended drawings are exemplary and are not intended to limit the scope of the present disclosure.

What is claimed is:

1. An image lens system comprising, in order from an object side to an image side:
   a first lens element with negative refractive power comprising a concave image-side surface;
   a second lens element with positive refractive power comprising a convex object-side surface;
   a third lens element with negative refractive power comprising an object-side surface and a concave image-side surface, the object-side surface and the image-side surface being aspheric;
   a fourth lens element with positive refractive power comprising a convex object-side surface and a convex image-side surface; and
   a fifth lens element with negative refractive power comprising a convex object-side surface and a concave image-side surface, the object-side surface and the image-side surface being aspheric, the fifth lens element having at least one inflection point;
   the image lens system satisfying the following condition:

$0 \leq R_6/|R_5| < 1.0$ wherein $R_5$ is the curvature radius of the object-side surface of the third lens element, and $R_6$ is the curvature radius of the image-side surface of the third lens element.

2. The image lens system according to claim 1, wherein the image lens system satisfies the following condition:

$|R_6/R_7| < 0.9$ wherein $R_6$ is the curvature radius of the image-side surface of the third lens element, and $R_7$ is the curvature radius of the object-side surface of the fourth lens element.

3. The image lens system according to claim 2, wherein the second lens element comprises an image-side surface, and the image lens system satisfies the following condition:

$0 \leq R_3/|R_4| \leq 1.0$ wherein $R_3$ is the curvature radius of the object-side surface of the second lens element, and $R_4$ is the curvature radius of the image-side surface of the second lens element.

4. The image lens system according to claim 2, wherein the image lens system satisfies the following condition:

$0.3 < R_2/T_{12} < 1.6$ wherein $R_2$ is the curvature radius of the image-side surface of the first lens element, and $T_{12}$ is the axial distance between the first lens element and the second lens element.

5. The image lens system according to claim 2, wherein the image lens system satisfies the following condition:

$1.5 < (V_4+V_3)/(V_4-V_3) < 3.0$ wherein $V_3$ is the Abbe number of the third lens element, and $V_4$ is the Abbe number of the fourth lens element.

6. The image lens system according to claim 2, wherein the object-side surface of the third lens element is convex.

7. The image lens system according to claim 1, wherein the image lens system satisfies the following condition:

$0 < (R_7+R_8)/(R_7-R_8) < 1.0$ wherein $R_7$ is the curvature radius of the object-side surface of the fourth lens element, and $R_8$ is the curvature radius of the image-side surface of the fourth lens element.

8. The image lens system according to claim 7, wherein the image lens system satisfies the following condition:

$1.7 < (R_9+R_{10})/(R_9-R_{10}) < 5.3$ wherein $R_9$ is the curvature radius of the object-side surface of the fifth lens element, and $R_{10}$ is the curvature radius of the image-side surface of the fifth lens element.

9. The image lens system according to claim 7, wherein at least two of the first lens element, the second lens element, the third lens element, the fourth lens element and the fifth element are made of plastic.

10. The image lens system according to claim 7, wherein the image lens system satisfies the following condition:

$80(\text{degrees;deg.}) < FOV < 160(\text{deg.})$ wherein FOV is the maximal field of view in the image lens system.

11. The image lens system according to claim 7, wherein the first lens element comprises an object-side surface and the image lens system satisfies the following condition:

$0.15 < Dr_5r_{10}/TD < 0.40$ wherein $Dr_5r_{10}$ is the axial distance between the object-side surface of the third lens element and the image-side surface of the fifth lens element, and TD is the axial distance between the object-side surface of the first lens element and the image-side surface of the fifth lens element.

12. The image lens system according to claim 1, wherein the image lens system satisfies the following condition:

$0.3 < f/f_{12} < 1.0$ wherein f is the focal length of the image lens system, and $f_{12}$ is the composite focal length of the first lens element and the second lens element.

13. The image lens system according to claim 1, wherein the image lens system satisfies the following condition:

$0 < f_{12}/f_{345} < 1.0$ wherein $f_{12}$ is the composite focal length of the first lens element and the second lens element, and $f_{345}$ is the composite focal length of the third lens element, the fourth lens element and the fifth lens element.

14. An image lens system comprising, in order from an object side to an image side:
    a first lens element with negative refractive power comprising a concave image-side surface;
    a second lens element with positive refractive power comprising a convex object-side surface;
    a third lens element with negative refractive power comprising an object-side surface and a concave image-side surface, the object-side surface and the image-side surface being aspheric;

a fourth lens element with positive refractive power comprising a convex image-side surface; and a fifth lens element with negative refractive power comprising a convex object-side surface and a concave image-side surface, the fifth lens element being made of plastic, the object-side surface and the image-side surface being aspheric, the fifth lens element having at least one inflection point;

the image lens system satisfying the following condition:

$$0 \leq R_6/|R_5| < 1.0;$$

$$0.5 \text{(millimeters;mm)} < f/\tan(\text{HFOV}) < 3.0 \text{(mm)}$$

wherein $R_5$ is the curvature radius of the object-side surface of the third lens element, $R_6$ is the curvature radius of the image-side surface of the third lens element, f is the focal length of the image lens system, and HFOV is a half of the maximal field of view in the image lens system.

15. The image lens system according to claim 14, wherein the image lens system satisfies the following condition:

$$0.30 < f/f_{12} < 1.0$$

wherein f is the focal length of the image lens system, and $f_{12}$ is the composite focal length of the first lens element and the second lens element.

16. The image lens system according to claim 14, wherein the image lens system satisfies the following condition:

$$0 < f_{12}/f_{345} < 1.0$$

wherein $f_{12}$ is the composite focal length of the first lens element and the second lens element, and $f_{345}$ is the composite focal length of the third lens element, the fourth lens element and the fifth lens element.

17. The image lens system according to claim 14, wherein the object-side surface of the third lens element is convex.

18. The image lens system according to claim 14, wherein the second lens element comprises an image-side surface and the image lens system satisfies the following condition:

$$0 \leq R_3/|R_4| \leq 1.0$$

wherein $R_3$ is the curvature radius of the object-side surface of the second lens element, and $R_4$ is the curvature radius of the image-side surface of the second lens element.

19. The image lens system according to claim 14, wherein the fourth lens element comprises an object-side surface and the image lens system satisfies the following condition:

$$|R_6/R_7| < 0.9$$

wherein $R_6$ is the curvature radius of the image-side surface of the third lens element, and $R_7$ is the curvature radius of the object-side surface of the fourth lens element.

20. The image lens system according to claim 14, wherein the image lens system satisfies the following condition:

$$1.5 < (V_4+V_3)/(V_4-V_3) < 3.0$$

wherein $V_3$ is the Abbe number of the third lens element, and $V_4$ is the Abbe number of the fourth lens element.

21. An image lens system comprising, in order from an object side to an image side:

a first lens element with negative refractive power comprising a concave image-side surface;

a second lens element with positive refractive power comprising a convex object-side surface;

a third lens element with negative refractive power comprising a convex object-side surface and a concave image-side surface, the object-side surface and the image-side surface being aspheric;

a fourth lens element with positive refractive power comprising a convex image-side surface; and a fifth lens element with negative refractive power comprising a convex object-side surface and a concave image-side surface, the fifth lens element being made of plastic, the object-side surface and the image-side surface being aspheric, the fifth lens element having at least one inflection point;

the image lens system satisfying the following condition:

$$0 \leq R_6/|R_5| < 1.0$$

wherein $R_5$ is the curvature radius of the object-side surface of the third lens element, and $R_6$ is the curvature radius of the image-side surface of the third lens element.

22. The image lens system according to claim 21, wherein fourth lens element comprises an object-side surface and the image lens system satisfies the following condition:

$$0 < (R_7+R_8)/(R_7-R_8) < 1.0$$

wherein $R_7$ is the curvature radius of the object-side surface of the fourth lens element, and $R_8$ is the curvature radius of the image-side surface of the fourth lens element.

23. The image lens system according to claim 21, wherein the fourth lens element comprises an object-side surface and the image lens system satisfies the following condition:

$$|R_6/R_7| < 0.9$$

wherein $R_6$ is the curvature radius of the image-side surface of the third lens element, and $R_7$ is the curvature radius of the object-side surface of the fourth lens element.

24. The image lens system according to claim 21, wherein the second lens element comprises an image-side surface and the image lens system satisfies the following condition:

$$0 \leq R_3/|R_4| \leq 1.0$$

wherein $R_3$ is the curvature radius of the object-side surface of the second lens element, and $R_4$ is the curvature radius of the image-side surface of the second lens element.

25. The image lens system according to claim 21, wherein the image lens system satisfies the following condition:

$$0.30 < f/f_{12} < 1.0$$

wherein f is the focal length of the image lens system, and $f_{12}$ is the composite focal length of the first lens element and the second lens element.

26. The image lens system according to claim 21, wherein the image lens system satisfies the following condition:

$$0 < f_{12}/f_{345} < 1.0$$

wherein $f_{12}$ is the composite focal length of the first lens element and the second lens element, and $f_{345}$ is the composite focal length of the third lens element, the fourth lens element and the fifth lens element.

* * * * *

UNITED STATES PATENT AND TRADEMARK OFFICE
CERTIFICATE OF CORRECTION

| | | |
|---|---|---|
| PATENT NO. | : 8,792,185 B2 | |
| APPLICATION NO. | : 13/594197 | |
| DATED | : July 29, 2014 | |
| INVENTOR(S) | : Chih-Wen Hsu et al. | |

It is certified that error appears in the above-identified patent and that said Letters Patent is hereby corrected as shown below:

In the Claims:

Column 29, line 42: "$0 \leq R_6 \mid R_5 \mid < 1.0$" should read - $0 \leq R_6 / \mid R_5 \mid < 1.0$ -.

Signed and Sealed this
Twenty-first Day of October, 2014

Michelle K. Lee
*Deputy Director of the United States Patent and Trademark Office*